US011159039B2

(12) United States Patent
Matsumura et al.

(10) Patent No.: US 11,159,039 B2
(45) Date of Patent: Oct. 26, 2021

(54) APPARATUS AND METHOD FOR BATTERY CHARGING WITH LITHIUM PLATING DETECTION AND BATTERY DEGRADATION DETECTION AND SEPARATION

(71) Applicant: INTEL CORPORATION, Santa Clara, CA (US)

(72) Inventors: Naoki Matsumura, San Jose, CA (US); Aaron Gorius, Upton, ME (US)

(73) Assignee: INTEL CORPORATION, Santa Clara, CA (US)

( * ) Notice: Subject to any disclaimer, the term of this patent is extended or adjusted under 35 U.S.C. 154(b) by 179 days.

(21) Appl. No.: 16/458,028

(22) Filed: Jun. 29, 2019

(65) Prior Publication Data
US 2020/0412153 A1 Dec. 31, 2020

(51) Int. Cl.
*H01M 10/46* (2006.01)
*H02J 7/00* (2006.01)
*H01M 10/44* (2006.01)
*H01M 10/48* (2006.01)

(52) U.S. Cl.
CPC ..... *H02J 7/007184* (2020.01); *H01M 10/441* (2013.01); *H01M 10/482* (2013.01); *H02J 7/0021* (2013.01)

(58) Field of Classification Search
CPC .. H02J 7/0029; H02J 7/00302; H02J 7/00304; H02J 7/00306; H02J 7/0038; H02J 7/00309; H02J 7/007184; H01M 10/44; H01M 10/10441; H01M 10/425; H01M 10/482; H01M 10/443; H01M 2010/4271; H01M 2010/4278
USPC ....... 320/116, 122, 134, 136, 132, 149, 150, 320/152, 162
See application file for complete search history.

(56) References Cited

U.S. PATENT DOCUMENTS

| 7,362,074 | B2* | 4/2008 | Iwane | G01R 31/392 |
| | | | | 320/132 |
| 2001/0028238 | A1* | 10/2001 | Nakamura | G01R 31/389 |
| | | | | 320/132 |
| 2017/0234930 | A1 | 8/2017 | Lee et al. | |
| 2017/0310137 | A1* | 10/2017 | Ha | H02J 7/045 |
| 2018/0226693 | A1* | 8/2018 | Hong | H02J 7/0071 |
| 2018/0292461 | A1* | 10/2018 | Kim | G01R 31/36 |
| 2019/0152341 | A1 | 5/2019 | Jin et al. | |
| 2020/0321797 | A1* | 10/2020 | Gerrits | H02J 7/0027 |

FOREIGN PATENT DOCUMENTS

| KR | 20090014897 | 2/2009 |
| KR | 10-20140103753 A | 8/2014 |
| KR | 20160058281 | 5/2016 |

OTHER PUBLICATIONS

Translation of KR-1020140103753 (Aug. 27, 0214) (Year: 2014).*
International Search Report for Related PCT Application PCT/US2020/024479, dated Jul. 16, 2020, 3 pages.

* cited by examiner

*Primary Examiner* — Edward Tso
(74) *Attorney, Agent, or Firm* — Schwabe, Williamson & Wyatt, P.C.

(57) ABSTRACT

In some examples, an apparatus includes a controller to monitor voltage of a battery during constant current charging of the battery, and to detect lithium plating of the battery based on a rate of change of the monitored voltage of the battery during constant current charging of the battery. In some examples, a battery module includes a plurality of battery cells connected in parallel, and a controller to determine an impedance of each of the plurality of battery cells, and to disconnect one of the plurality of battery cells from the plurality of battery cells based on a relation of the impedance of the one of the plurality of battery cells with a threshold impedance.

25 Claims, 14 Drawing Sheets

100

200

300

700

1000

1100

1200

1300

APPARATUS AND METHOD FOR BATTERY CHARGING WITH LITHIUM PLATING DETECTION AND BATTERY DEGRADATION DETECTION AND SEPARATION

TECHNICAL FIELD

This disclosure relates generally to battery charging with lithium plating detection and to battery degradation detection and/or degraded battery separation.

BACKGROUND

During charging of a lithium ion (Li-ion) battery, lithium ions in the battery normally move from a cathode material (for example, such as $LiCoO_2$) to an anode material (such as, for example, graphite), and may be absorbed in the anode structure (for example, lithium ions may diffuse in a graphite anode material). There may be no lithium in the graphite anode prior to charging, lithium can move to the anode during charging, and lithium may be captured in the graphite structure of the anode. However, if charge current is higher than lithium ion diffusion in the anode material during very fast charging, for example, lithium plating can occur on the surface of the anode electrode. Lithium can harden on the surface of the graphite, but the lithium plating may not grow in a flat manner. As a result, the lithium plating may cause dendrite (for example, in a needle shape) as the charge continues. The dendrite may touch the cathode, resulting in a thermal runaway causing an internal short circuit. If left charging in such a situation, the battery can cause dangerous situations such as explosion of the battery, for example.

A stationary computing system such as a server may be powered using power from a power supply unit (PSU). In addition, a stationary computing system may also include an internal energy storage device (for example, one or more battery such as one or more lithium ion battery). The system may perform better using power from both the power supply unit and the battery (or batteries) in accordance with some embodiments. In such a system, in order to support system peak load, parallel connected battery cells may be used. However, if one or more of the parallel connected battery cells degrades too much, continued use of that battery cell (or battery cells) can create a safety risk.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DETAILED DESCRIPTION

Figure 1:
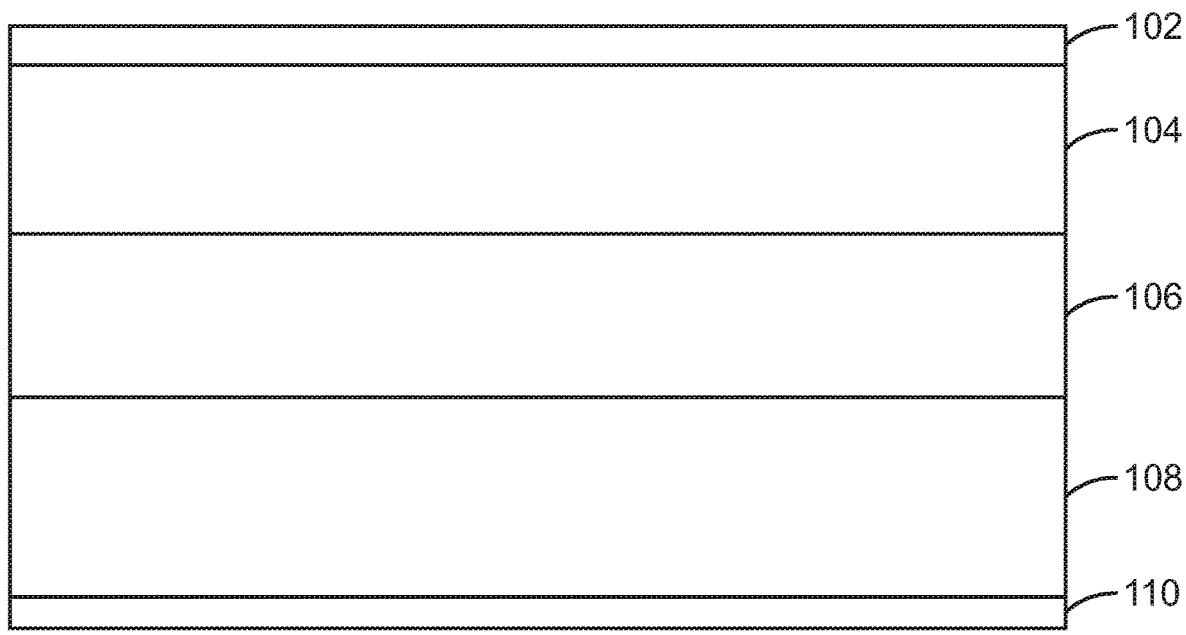
FIG. 1 illustrates a battery.

Some embodiments relate to battery charging. For example, some embodiments relate to fast battery charging. Some embodiments relate to fast battery charging and lithium plating avoidance and/or detection.

Some embodiments relate to detecting battery degradation. For example, some embodiments relate to detection and/or separation of a degraded battery cell from parallel connected battery cells.

Some embodiments relate to battery charging and/or to detecting battery degradation. For example, some embodiments relate to battery charging, to fast battery charging, to lithium plating avoidance and/or detection, to detecting battery degradation, and/or to detection and/or separation of a degraded battery cell from parallel connected battery cells.

Lithium ion (Li-ion) batteries may be used as an energy storage device for computing systems. A C-rate of a battery can indicate that the discharge current of the battery will discharge the entire battery in one hour, for example. If the capacity of a battery is rated at 1 C, for example, a fully charged battery rated at 1 amp hour (1 Ah) should provide 1 A for one hour. The same fully charged battery discharging at 0.5 C should provide 500 mA for two hours, and the same fully charged battery discharging at 2 C should deliver 2 A for 30 minutes, for example. Some lithium ion batteries, for example, are capable of faster discharge current (for example, at 15 C) as compared with a conventional 1 C discharge current. However, charge current is typically limited to a lower C-rate than discharge current. This can be true even for a battery capable of fast discharge. A battery may have, for example, a maximum 2 C charge vs. a maximum 15 C discharge. This occurs in batteries that have too fast of a discharge, which can cause lithium plating (Li-plating). Lithium plating may happen, for example, on the surface of an anode electrode, and may cause an unsafe situation such as an internal short circuit.

During charging, lithium ions (Li-ions) in a battery normally move from a cathode material (for example, such as $LiCoO_2$) to an anode material (such as, for example, graphite), and may be absorbed in the anode structure (for example, lithium ions may diffuse in a graphite anode material). There may be no lithium in the graphite anode prior to charging, lithium can move to the anode during charging, and lithium may be captured in the graphite structure of the anode. However, if charge current is higher than lithium ion diffusion in the anode material during very fast charging, for example, lithium plating can occur on the surface of the anode electrode. Lithium can harden on the surface of the graphite, but the lithium plating may not grow in a flat manner. As a result, the lithium plating may cause dendrite (for example, in a needle shape) as the charge continues. The dendrite may touch the cathode, resulting in a thermal runaway causing an internal short circuit.

FIG. 1 illustrates a battery 100. Battery 100 may be a lithium ion (Li-ion) battery. Battery 100 may include a cathode current collector 102, a cathode electrode 104, a separator 106, an anode electrode 108, and an anode current collector 110. The cathode current collector 102 may be an aluminum (Al) cathode current collector. The cathode 104 may be an $LiCoO_2$ cathode. The anode 108 may be a graphite anode. The anode current collector 110 may be a copper (Cu) anode current collector.

Figure 2:
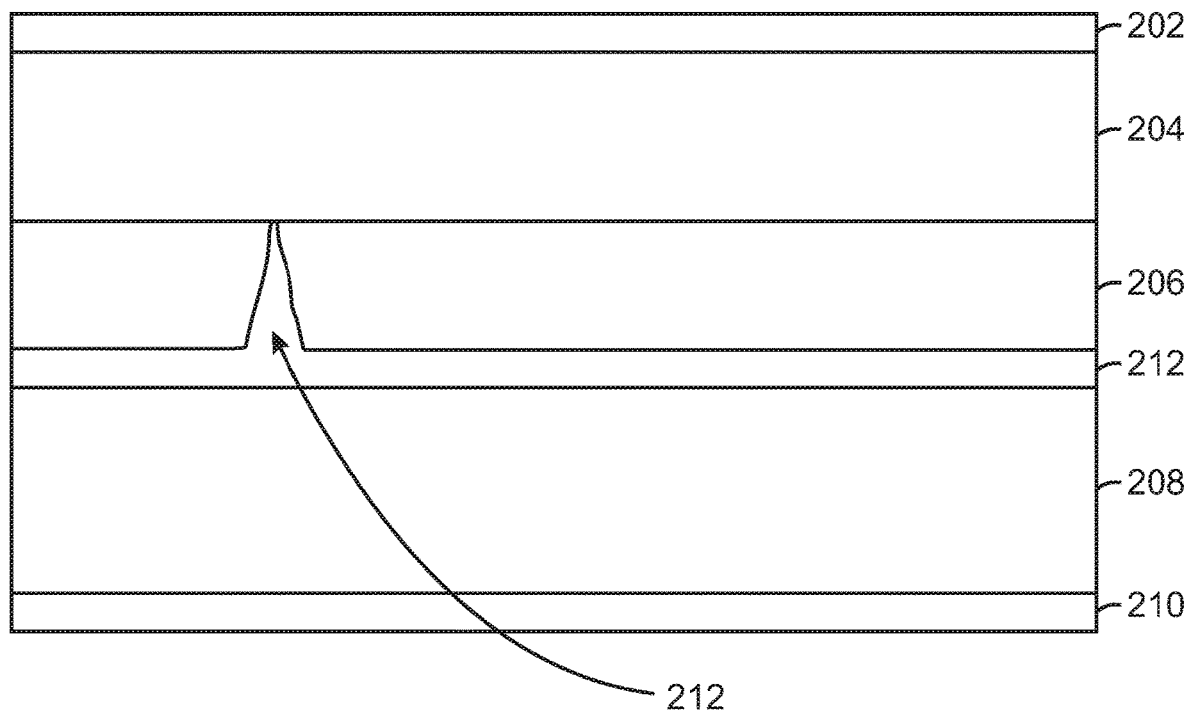
FIG. 2 illustrates a battery.

FIG. 2 illustrates a battery 200. Battery 200 may be a lithium ion (Li-ion) battery. Battery 200 may include a cathode current collector 202, a cathode 204, a separator 206, an anode 208, and an anode current collector 210. Cathode current collector 202 may be an aluminum (Al) cathode current collector. The cathode 204 may be an $LiCoO_2$ cathode. The anode 208 may be a graphite anode. The anode current collector 210 may be a copper (Cu) anode current collector.

Battery 100 and battery 200 may be the same battery. That is, battery 100 may be the battery at an initial stage (for example, prior to charging) and battery 200 may be the same battery after lithium plating occurs during charging of the battery. FIG. 2 illustrates a lithium metal dendrite 212 that may occur during charging of the battery 100 and/or 200. Lithium plating and dendrite 212 can occur, for example, during a fast charging operation of the battery 200.

Spiky dendritic crystals (for example, as illustrated by dendrite 212 in FIG. 2) can grow on the surface of anode 208 during charging of the battery 200 (for example, during charging of lithium battery 200). For example, if battery 200 is a lithium ion battery, lithium ions (Li-ions) in the battery 200 may move from the cathode 204 to the anode 208. The lithium ions may be absorbed in the anode 208. However, if charge current is higher than lithium ion diffusion in the anode material, for example, one or more lithium metal dendrites 212 may occur on the surface of the anode 208. Such lithium plating may cause dendrite 212 as the charge continues. The dendrite 212 may touch the cathode 204, resulting in an internal short circuit between cathode 204 and anode 208. If left charging in such a situation, the battery can cause dangerous situations such as explosion of the battery, for example. Fast charging of the battery is helpful as long as a dendrite such as dendrite 212 does not occur due to lithium plating. Therefore, it is advantageous to detect lithium plating during fast battery charging in order to avoid lithium plating, dendrites, and/or short circuits of the battery.

Lithium plating may be detected, for example, if a third electrode is included as a reference electrode in addition to the cathode and anode electrodes (for example, in addition to cathode 204 and anode 208). However, a third electrode takes up space in the battery, and most lithium ion (Li-ion) batteries do not include a third electrode in order to save space and to maximize energy density, for example. Therefore, in some embodiments, lithium plating is detected in a battery without use of a third battery electrode. Battery charge current may be limited without implementing lithium plating detection in order to avoid lithium plating and to avoid short circuits as a result of lithium plating. However, limiting battery charge current in this manner can lower the capability of the battery and may cause a reduction in performance and inconvenience to users. In some embodiments, lithium plating may be detected without use of a third electrode and while still enabling fast charge (for example, without completely limiting battery charge current, without creating a reduction in performance, and/or without inconveniencing users).

In accordance with some embodiments, detection of lithium plating can enable faster battery charging while maintaining safety (for example, by avoiding internal short circuits of the battery). In some embodiments, lithium plating can be detected without using a third electrode. In some embodiments, fast charge of a battery may be enabled by monitoring battery voltage during charge, comparing a slope (or rate of change) of the battery charging voltage with a reference battery charging voltage slope (or rate of change) value. If a slope (rate of change) of the battery charging voltage over time is flatter than a reference slope (reference rate of change) of the reference battery charging voltage over time, lithium plating is detected in accordance with some embodiments. When lithium plating is detected, the battery charge current may be reduced or stopped in accordance with some embodiments. This reduction or stopping of battery charge current can provide enough time for lithium plating to be absorbed (for example, to be absorbed in the anode material). After enough time passes so that lithium plating is no longer detected, battery charge current may be restarted and/or increased so that fast charging may be continued. In this manner, faster battery charging may be implemented while still maintaining safety by avoiding lithium plating that could cause internal battery short circuits to occur.

Figure 3:
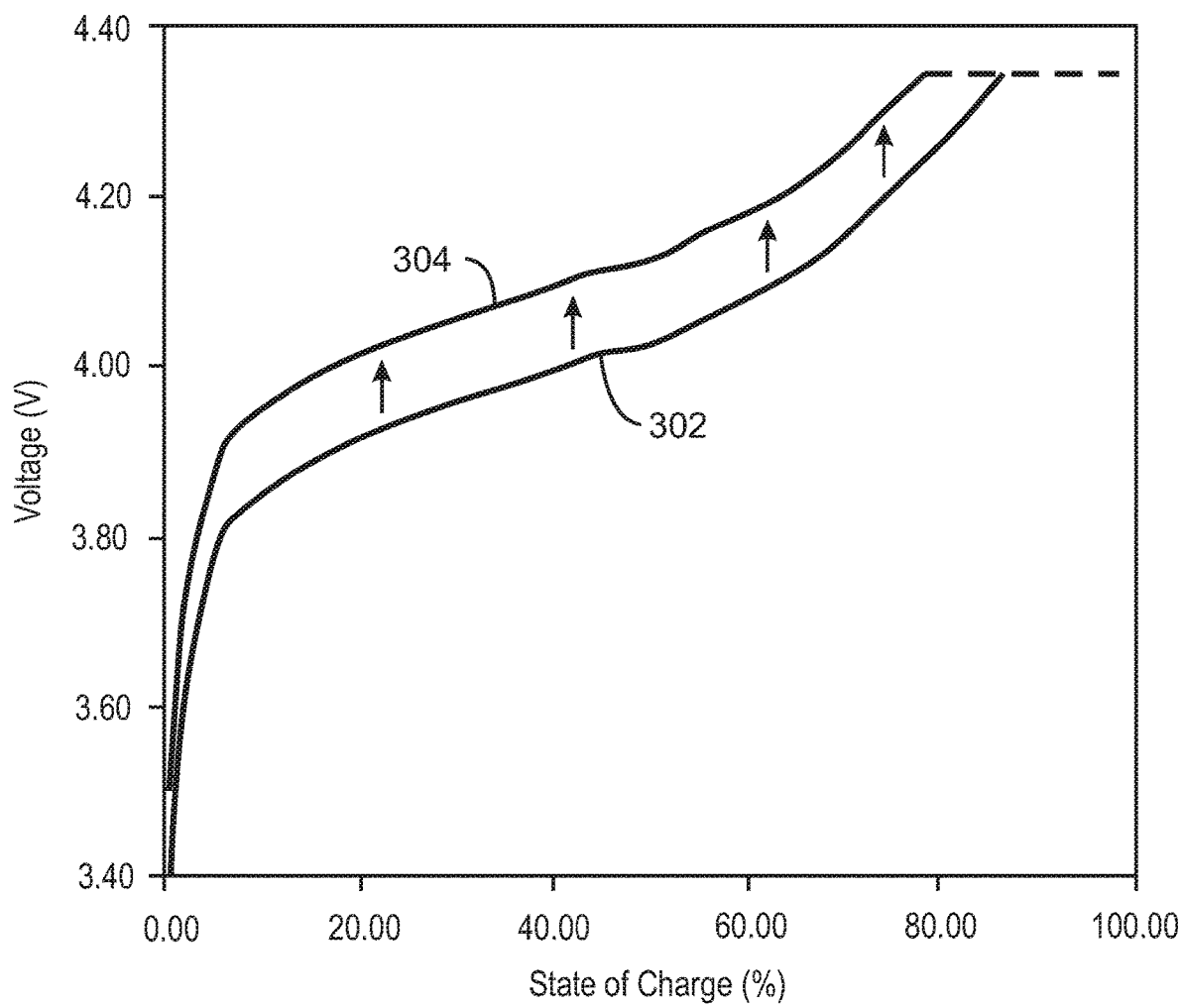
FIG. 3 is a graph illustrating battery voltage during battery charging.

FIG. 3 illustrates an example voltage vs. percentage state of charge diagram 300, including a low charge current waveform 302 (for example, battery charging where battery charge current is relatively low during a normal slow charge of the battery) and a medium charge current waveform 304 (for example, battery charging where battery current is more in a medium level at a higher charge current than the charge current in waveform 302). Diagram 300 illustrates, for example, how lithium ion battery voltage may change during charge. For example, lithium ion battery charging may start with a constant current (CC) charge followed by a constant voltage (CV) charge. Waveforms 302 and 304 include solid portions representing constant current charge followed by dotted line portions representing constant voltage charge. When charge current is increased from low charge current to medium charge current (as represented by the arrows in FIG. 3 moving from low charge current waveform 302 to medium charge current waveform 304), observed battery voltage is increased. This is due to, for example, battery impedance. However, it is noted that the medium charge curve 304 during constant current charging is generally similar to (for example, generally similar in slope to) the low charge curve 302.

Figure 4:
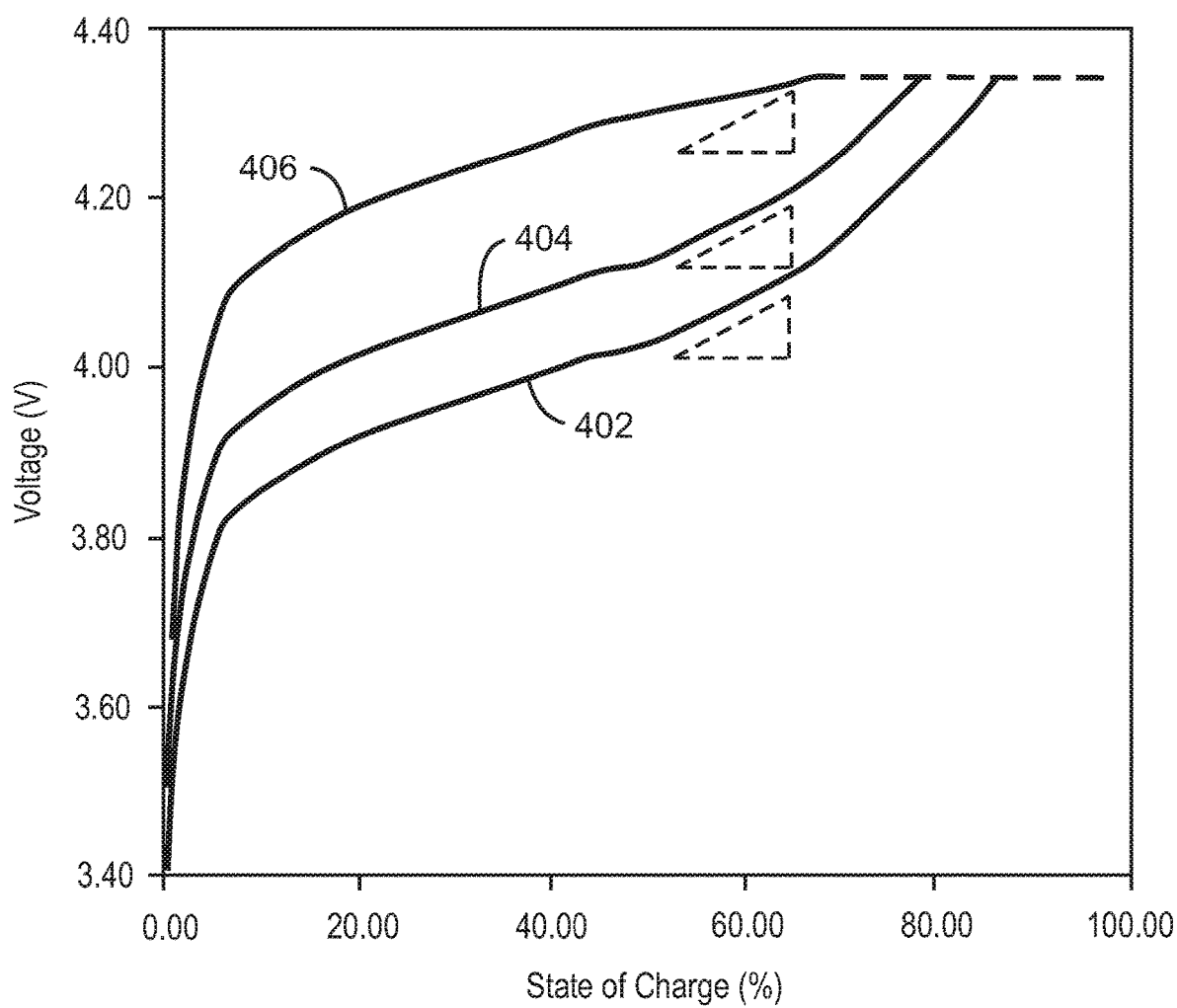
FIG. 4 is a graph illustrating battery voltage during battery charging.

FIG. 4 illustrates an example voltage vs. percentage state of charge diagram 400, including a low charge current waveform 402 (for example, battery charging where battery charge current is relatively low), a medium charge current waveform 404 (for example, battery charging where battery current is more in a medium level), and a high charge current waveform 406 (for example, battery charging where battery charge current is relatively high such as during very fast battery charging). Diagram 400 illustrates, for example, how lithium ion battery voltage may change during charge. For example, lithium ion battery charging may start with a constant current (CC) charge followed by a constant voltage (CV) charge. Waveforms 402, 404, and 406 include solid portions representing constant current charge followed by dotted line portions representing constant voltage charge. When charge current is increased from low charge current to medium charge current, observed battery voltage is increased. Similarly, when charge current is increased from medium charge current to high charge current, observed battery voltage is increased. This is due to, for example, battery impedance. However, it is noted that the medium charge curve 404 during constant current charging is generally similar to (for example, generally similar in slope to) the low charge curve 402. It is also noted that the high charge curve 406 during constant current charging is generally different than (for example, generally different in slope than) the low charge curve 402 and the medium charge curve 404. This can illustrate, for example, the concept that when battery charge current is high and lithium plating occurs at some point, a slope of change of a battery voltage charge curve during constant current (CC) charging becomes flatter than a slope of change of a battery voltage charge curve during constant current at a lower charge current at which lithium plating does not occur.

The dotted triangles in FIG. 4 represent a particular slope (or rate of change) of the battery voltage over time (for example, a slope such as a reference slope of the battery voltage over time). It is noted that the dotted triangles are included in FIG. 4 to help show that the slopes (or rates of change) of curves 402 and 404 are similar, but that the slope (or rate of change) of curve 406 is lower than the slopes (or rates of change) of curves 402 and 404. This helps to show that when battery charge current is high and lithium plating occurs at some point, the slope of the charge curve during constant current (CC) charging becomes flatter (lower slope) than slopes of the charge curve at lower battery charge currents due to lithium plating. Additionally, it is noted that lithium plating may have a higher likelihood of occurring as a battery becomes degraded over time. Although the slope is measured in FIG. 4 at a point where lithium plating occurs around 60% state of charge (SOC), it is noted that this point is just used as an example in FIG. 4, and that lithium plating can occur at other states of charge of the battery. In some embodiments, the slope may be measured throughout constant current (CC) charging in order to detect any point at which the slope falls below a reference level used to indicate that lithium plating is occurring.

Lithium plating can occur because battery cell voltage is the difference between cathode potential and anode potential. As charge continues, cathode potential increases and anode potential decreases versus Li/Li$^+$. Therefore cell voltage increases. When lithium ion plating (Li-plating) occurs, anode potential becomes zero versus Li/Li$^+$. After that, cell voltage increases only by cathode potential increase, which leads to a flatter voltage increase than in a situation where lithium ion plating does not occur.

Figure 5:
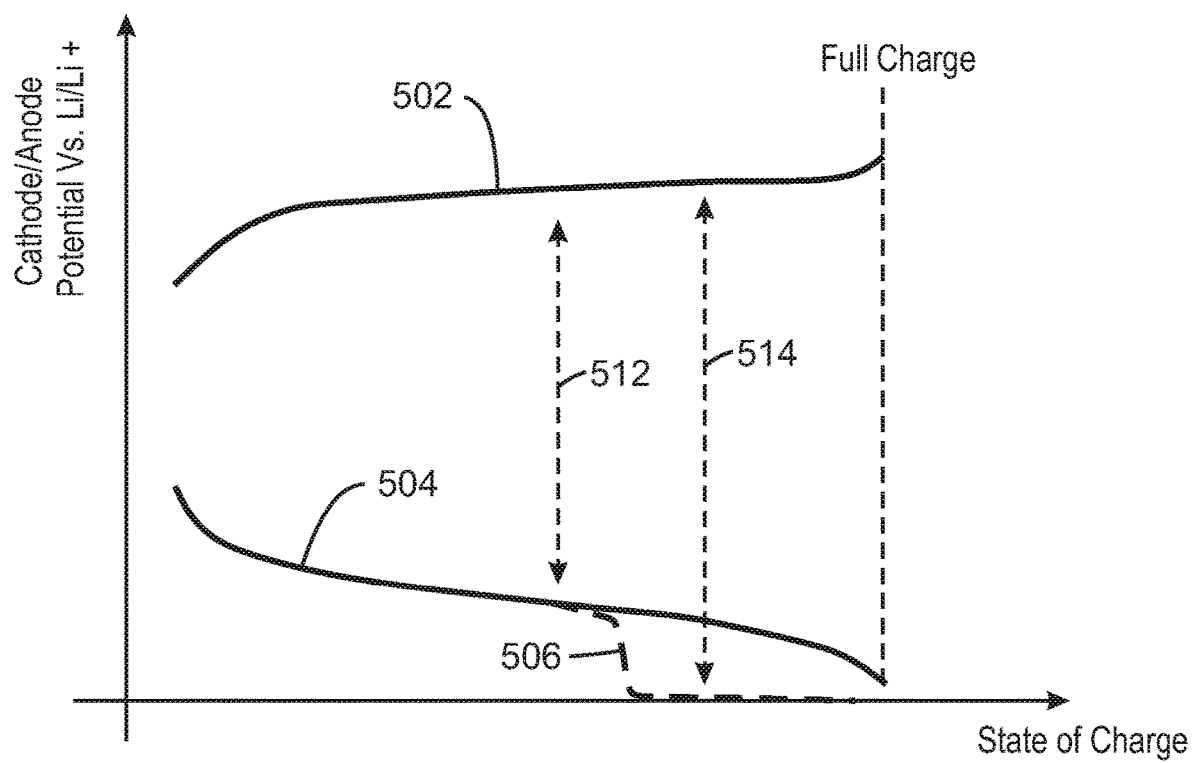
FIG. 5 is a graph illustrating cathode potential and anode potential during battery charging.

FIG. 5 illustrates an example diagram 500 illustrating cathode/anode potential vs. Li/Li$^+$ as state of charge of the battery increases during charging, including a cathode potential waveform 502 (for example, a cathode voltage waveform) and an anode potential waveform 504 (for example, an anode voltage waveform). FIG. 5 illustrates, for example, how cathode voltage typically increases during charging and anode voltage typically decreases during charging. Dotted line 506 illustrates anode potential with lithium plating in an example of high current charging (where, for example, if lithium plating occurs, anode potential vs. Li/Li$^+$ quickly drops to zero). Dotted line 512 illustrates battery cell voltage in an example situation where lithium plating does not occur, dotted line 514 illustrates battery cell voltage in an example situation where lithium plating does occur, and the dotted line to the right of dotted line 514 illustrates a situation where the battery is at a full charge state.

In some embodiments, a slope (or rate of change) of the battery voltage vs. a state of charge (SOC) during a fast constant current (CC) charge is monitored, and lithium plating is detected when the slope (or rate of change) becomes flatter than (or less than) a reference slope value (or reference rate of change value). When lithium plating is detected, the system can decrease or stop the charge current so that enough time is provided for lithium to be absorbed in the anode material.

In some embodiments, fast battery charge may be enabled by monitoring battery voltage during charge and comparing a slope (or rate of change) of the charging voltage as the battery is being charged with a reference slope (or reference rate of change) value (for example, by comparing the slope of the battery charging voltage versus a state of charge with a reference slope value). If the slope of the charging voltage as the battery is being charged is less than the reference slope value, it can be considered to be lithium plating and lithium plating is therefore detected. The system can reduce or stop the battery charge current so that enough time goes by for the lithium plating to be absorbed (for example, to be absorbed in the battery anode material). After enough time goes by and lithium plating is no longer a concern, the battery charge current may be restarted and/or increased. For example, lithium plating may be reduced or may disappear altogether since lithium may be absorbed by the anode after charge current is reduced or stopped. Similarly, lithium plating may be reduced or may disappear altogether if the battery is discharged. In some embodiments, a notification may be made to a user if lithium plating is detected, and/or if the battery charge current is adjusted for any reason (for example, is decreased or stopped due to lithium plating, or is increased or restarted due to lithium plating no longer being a concern).

Lithium plating can be very dangerous. Therefore, different actions may be taken in various embodiments. In some embodiments, upon detection of lithium plating, the charging current may be stopped. In some embodiments, upon detection of lithium plating, the charging current may be lowered. In some embodiments, upon detection of lithium plating, the battery may be discharged. In some embodiments, after detection of lithium plating, the charge current of the battery may be permanently lowered during future charging events even after the lithium plating has disappeared in order to avoid lithium plating of that battery in the future.

In some embodiments, battery charging current may be lowered temporarily. In some embodiments, battery charging current may be lowered permanently for a particular battery.

In some embodiments, battery charge current may be increased if lithium plating is not detected.

In some embodiments, the y axis of the monitored curve may be battery open circuit voltage instead of battery voltage during charge. For example, in some embodiments, a slope (or rate of change) of the battery open circuit voltage vs. a state of charge (SOC) during a fast constant current charge is monitored, and lithium plating is detected when the slope (or rate of change) becomes flatter than a reference slope value (or reference rate of change).

In some embodiments, the x axis of the monitored curve (for example, on the x axis in FIG. 3, in FIG. 4, and/or in FIG. 5) may be charged capacity (such as battery charged capacity and/or battery charge capacity) instead of state of charge (SOC). The charged capacity on the x axis may be, for example, charged capacity in amp hours (Ah) and/or may be charged capacity in milliamp hours (mAh). For example, in some embodiments, a slope (or rate of change) of the battery voltage over charged capacity during a fast constant current (CC) charge is monitored, and lithium plating is detected when the slope (or rate of change) becomes flatter than a reference slope value (or reference rate of change value). In some examples, a slope (or rate of change) of the battery open circuit voltage over charged capacity during a fast constant current charge is monitored, and lithium plating is detected when the slope (or rate of change) becomes flatter than a reference slope value (or reference rate of change value).

In some embodiments, the x axis of the monitored curve may be time instead of state of charge (SOC). For example, in some embodiments, a slope (or rate of change) of the battery voltage over time during a fast constant current (CC) charge is monitored, and lithium plating is detected when the slope (or rate of change) becomes flatter than a reference slope value (or reference rate of change value). In some examples, a slope (or rate of change) of the battery open circuit voltage over time during a fast constant current charge is monitored, and lithium plating is detected when the slope (or rate of change) becomes flatter than a reference slope value (or reference rate of change value).

In some embodiments, battery charge current may be controlled to keep the battery within an allowable operation temperature.

In some embodiments, implementations discussed herein (such as, for example, lithium plating detection, comparison of battery voltage slope with a reference value, comparison of battery voltage rate of change with a reference value, decreasing charge current, increasing charge current, and/or stopping charge current, etc., among others) may occur partially or entirely within a memory space of the system, a battery pack, and/or a remote system, or some combination thereof. In some embodiments, implementations may include use of information from an integrated circuit (IC) in a battery pack (for example, in a fuel gauge IC), an IC in a system (for example, in a charger IC), or information from a remote system and/or local system. In some embodiments, implementations may be included in a processor, a field programmable gate array (FPGA), a discrete application specific integrated circuit (ASIC), and/or embedded in firmware, etc., among others.

In some embodiments, fast battery charge may increase battery temperature and/or decrease battery impedance. In some embodiments, a charge curve change relating to temperature and/or impedance change may be considered (for example, may be considered in detecting lithium plating).

Figure 6:
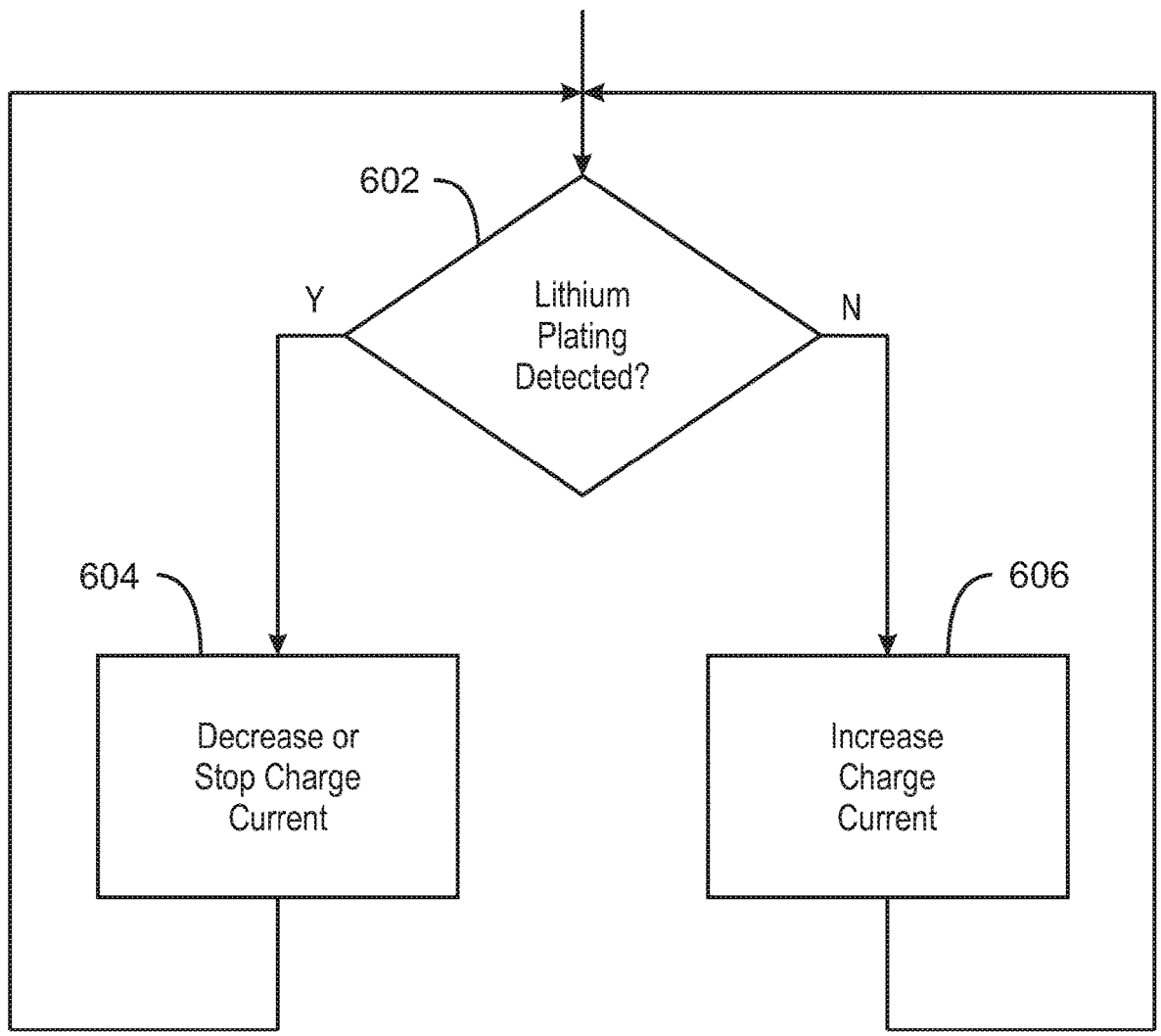
FIG. 6 is a graph illustrating lithium plating detection and avoidance in accordance with some embodiments.

FIG. 6 illustrates a flow 600 in accordance with some embodiments. In some embodiments, flow 600 may be used to enable fast battery charge while avoiding lithium plating. At 602 a determination is made as to whether lithium plating has been detected. Lithium plating may be detected at 602 in accordance with one or more techniques described herein. For example, in some embodiments, lithium plating may be detected at 602 by monitoring battery voltage during charge and comparing a slope (or rate of change) of the charging voltage with a reference slope (or reference rate of change). If the slope (or rate of change) of the charging voltage is less than the reference slope (or reference rate of change), for example, lithium plating is detected at 602. If lithium plating is detected at 602, a battery charge current may be decreased or stopped at 604, and flow may return to 602. If lithium plating is not detected at 602, the battery charge current may be increased at 606, and flow may then return to 602. It is noted that the battery charge current may be increased or may not be increased (or may not be changed) at 606 in accordance with some embodiments. For example, in some embodiments, when fast charging of the battery is ongoing and lithium plating is not detected, the battery charge current is not changed. In some embodiments, if lithium plating is not detected at 602, flow may return directly to 602 and charging may continue at the same battery charge current without increasing the charge current at 606.

Figure 7:
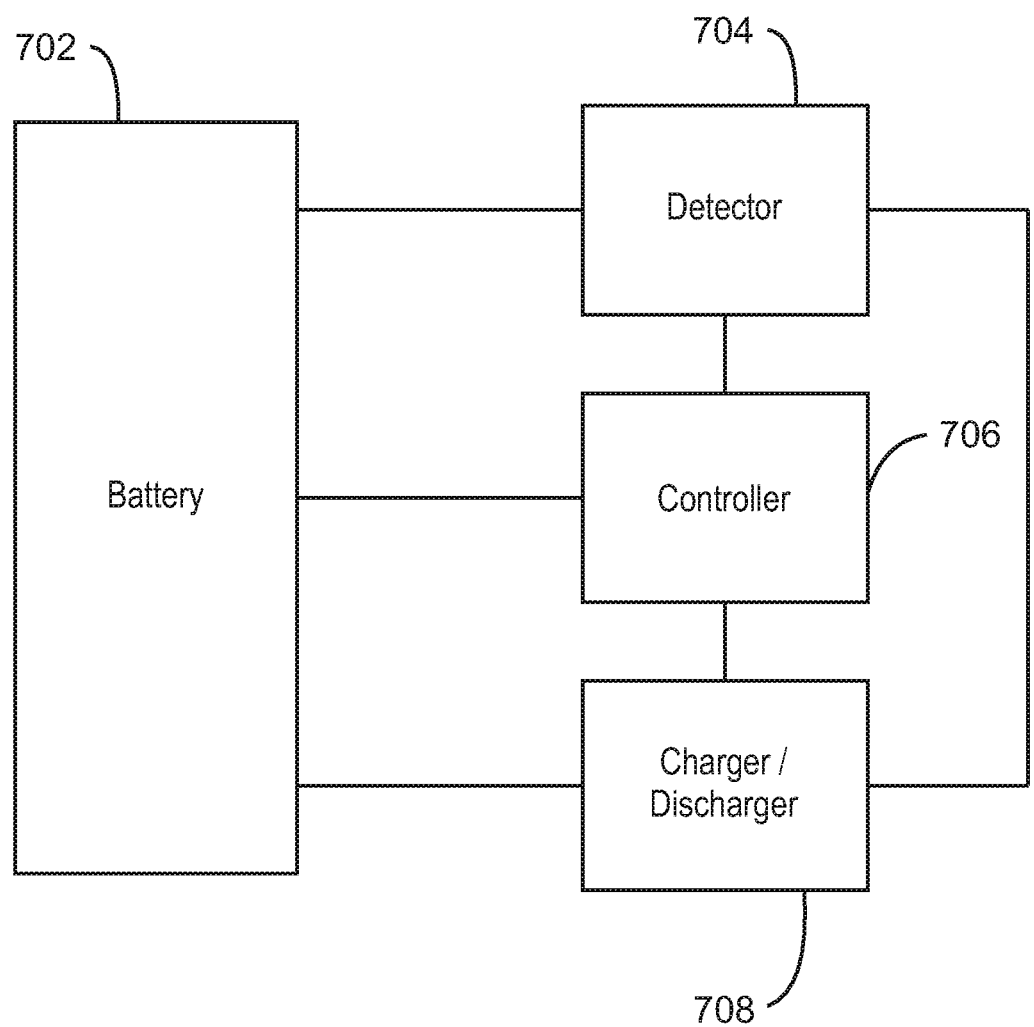
FIG. 7 illustrates a system in accordance with some embodiments.

FIG. 7 illustrates a system 700 in accordance with some embodiments. In some embodiments, system 700 may enable fast battery charging while avoiding lithium ion plating. System 700 includes a battery 702, a detector 704, a controller 706, and a battery charger/discharger 708. In some embodiments, battery 702 is a lithium ion battery. Detector 704 may implement techniques described herein. For example, detector 704 can monitor voltage of battery 702 during battery charge. Detector 704 can also compare a slope (or rate of change) of battery charging voltage of battery 702 (for example, a slope or rate of change of battery charging voltage vs. state of charge, and/or a slope or rate of change of battery charging voltage over time, etc.) with a reference value. Controller 706 may implement techniques described herein. For example, controller 706 can monitor voltage of battery 702 during battery charge, and can also compare a slope (or rate of change) of battery charging voltage of battery 702 (for example, a slope or rate of change of battery charging voltage vs. state of charge, and/or a slope of battery charging voltage over time, etc.) with a reference value. Controller 706 can also control charger/discharger 708 to implement charging and/or discharging of battery 702. For example, in some embodiments, controller 706 can control charger/discharger 708 to decrease a charge current of battery 702, to stop a charge current of battery 702, and/or to increase a charge current of battery 702.

Figure 8:
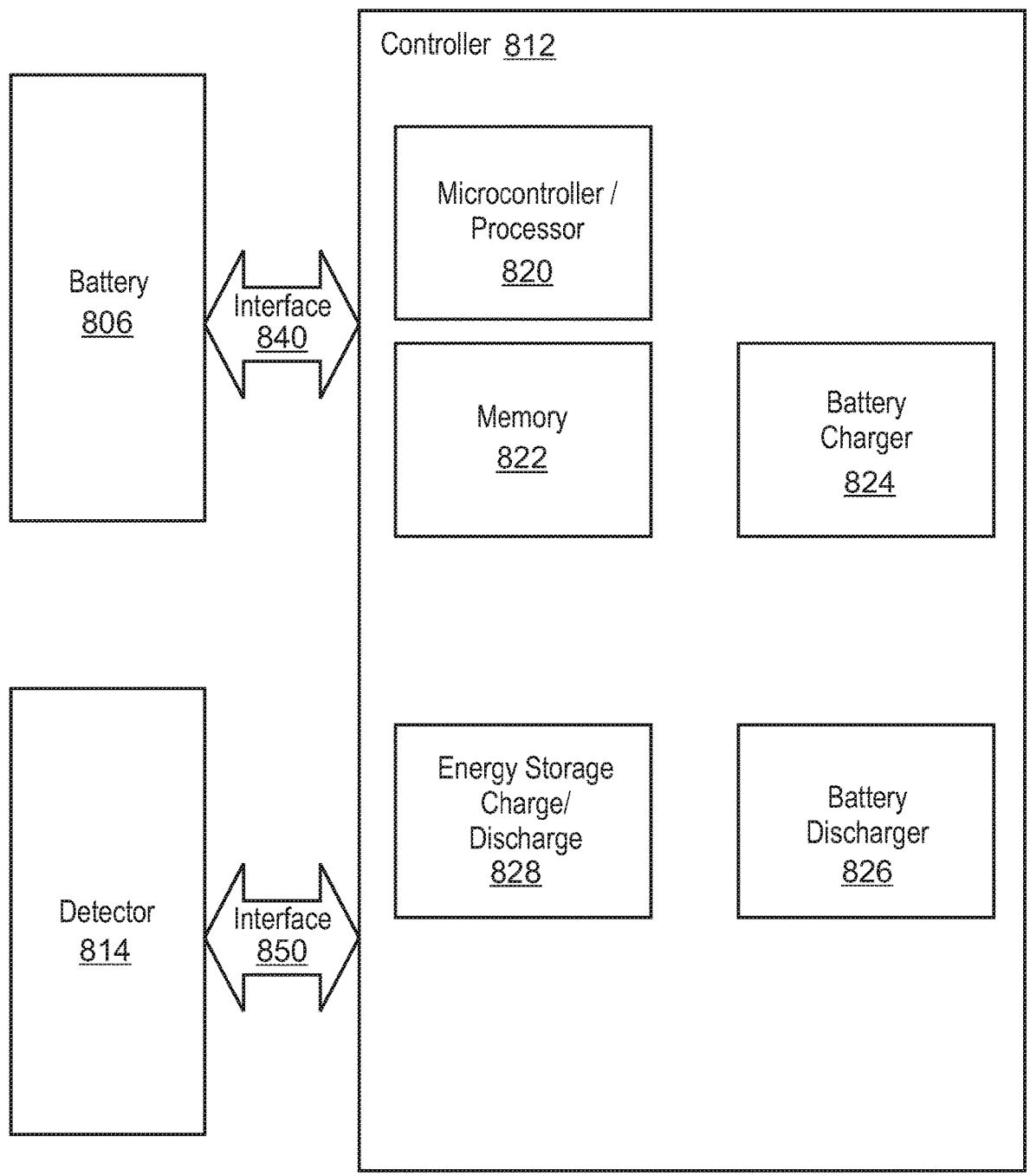
FIG. 8 illustrates a system in accordance with some embodiments.

FIG. 8 illustrates a system 800 in accordance with some embodiments. In some embodiments, system 800 includes a battery 806, a controller 812, and one or more detector 814 (and/or monitor 814 and/or sensor 814). In some embodiments, one or more detector 814 includes one or more voltage detector 814 to detect a voltage of battery 806 (such as a battery charge voltage of battery 806). In some embodiments, one or more detector 814 includes one or more current sensor 814. In some embodiments, one or more detector 814 includes one or more voltage sensor 814. In some embodiments, one or more detector 814 includes one or more temperature sensor 814. In some embodiments, one or more detector 814 includes a group of one or more sensors that can include one or more voltage sensors, and/or one or more current sensors, and/or one or more temperature sensors. In some embodiments, one or more detectors 814 can include one or more voltage/current/temperature sensors. In some embodiments, battery 806 is the same as (or similar to) batteries illustrated and/or described herein. In some embodiments, controller 812 is the same as (or similar to) other controllers illustrated and/or described herein. In some embodiments, detector(s) 814 is one or more sensor that is the same as or similar to other detectors, sensors, monitors, etc. as described herein. In some embodiments, controller 812 is a battery controller. In some embodiments, controller 812 is one or more of an application specific integrated circuit (ASIC), a digital signal processor (DSP), a field programmable gate array (FPGA), a processor, etc. including some of all of the functional blocks in FIG. 8 In some embodiments, all or part of controller 812 is implemented in software as stored on a memory (for example, memory 822) and executed by, for example, a processor or microcontroller (for example, microcontroller/processor 820). In some embodiments, controller 812 can be, for example, a control integrated circuit (IC). In some embodiments, controller 812 can be part of a power management integrated circuit (PMIC). In some embodiments, controller 812 can be part of a fuel gauge. In some embodiments, controller 812 can be part of a battery management system.

Controller 812 interfaces with battery 806 using an interface 840. Interface 840 can include a physical interface for supplying power and ground. In some embodiments, interface 840 includes a data interface.

Controller 812 interfaces with sensor(s) 814 using an interface 850. Interface 850 can include a physical interface for supplying power and ground. In some embodiments, interface 850 includes a data interface. In some embodiments, interface 850 can include one or more interfaces.

In some embodiments, controller 812 includes a processor or microcontroller 820, a memory 822, battery charger 824, battery discharger 826, and/or energy storage charge/discharge 828 (for example, included in battery power supplemental logic). In some embodiments, battery power supplemental logic included in controller 812 can determine whether the power provided by the battery of the power supply system is to be supplemented or not from energy storage. In some embodiments, battery power supplemental logic included in controller 812 can include a voltage supplemental module that can determine whether to supplement the power provided by the battery based on, for example, the voltage currently being provided to the system load. This may be based on voltage monitoring hardware that provides voltage measurements to voltage supplemental module. In some embodiments, if the voltage droops below a threshold, or other predetermined level, yet is above the voltage minimum of the system, then voltage supplemental module can trigger and control the power supply system to have the power provided by the battery to be supplemented by power from the energy storage. This control may include turning on/off switches in the power delivery system to enable power to flow to the system load or to energy storage, and/or to protect other components in the system, to decouple the system load from the battery, etc.

In some embodiments, battery power supplemental logic in controller 812 includes an energy storage charge and discharge module 828 that can control components in a hybrid power boost charging system to cause the energy storage to be charged at times and to be discharged and/or disabled at other times.

In some embodiments, logic in controller 812 includes logic to monitor battery voltage during battery charge. In some embodiments, logic in controller 812 includes logic to compare a slope (or rate of change) of the charging voltage as the battery is charged (for example, over charged capacity, and/or over time, and/or as state of charge increases) with a reference slope (or reference rate of change). In some embodiments, logic in controller 812 detects lithium plating in response to a comparison of a slope (or rate of change) of the charging voltage as the battery is charged (for example, over time and/or as state of charge increases) with a reference slope (or reference rate of change). In some embodiments, logic in controller 812 may be implemented to increase charging current, to decrease charging current, and/or to stop charging current of battery 806.

Controller 812 can also include mode selection logic that determines when to enter a particular mode, such as, for example, a charging mode or a discharging mode.

While not shown in FIG. 8, controller 812 can include analog-to-digital converters (ADCs), filters, and a digital amplifier. One or more of the ADCs, filters, and digital amplifier may be, for example, an ASIC, a DSP, an FPGA, a processor, etc. These elements may be used to convert and analog measurement (for example, battery current and voltage) to a digital value for use in the battery charging control process. The digital amplifier may be a differential amplifier that generates an analog signal based on the voltage change (for example, voltage drop) across the battery (for example, the difference in voltage values between the positive and negative terminal of the battery), which is then converted to a filtered digital value using the ADC and the filter.

In some embodiments, controller 812 includes a battery charger 824 to charge the battery using current charge from a power supply.

Figure 9:
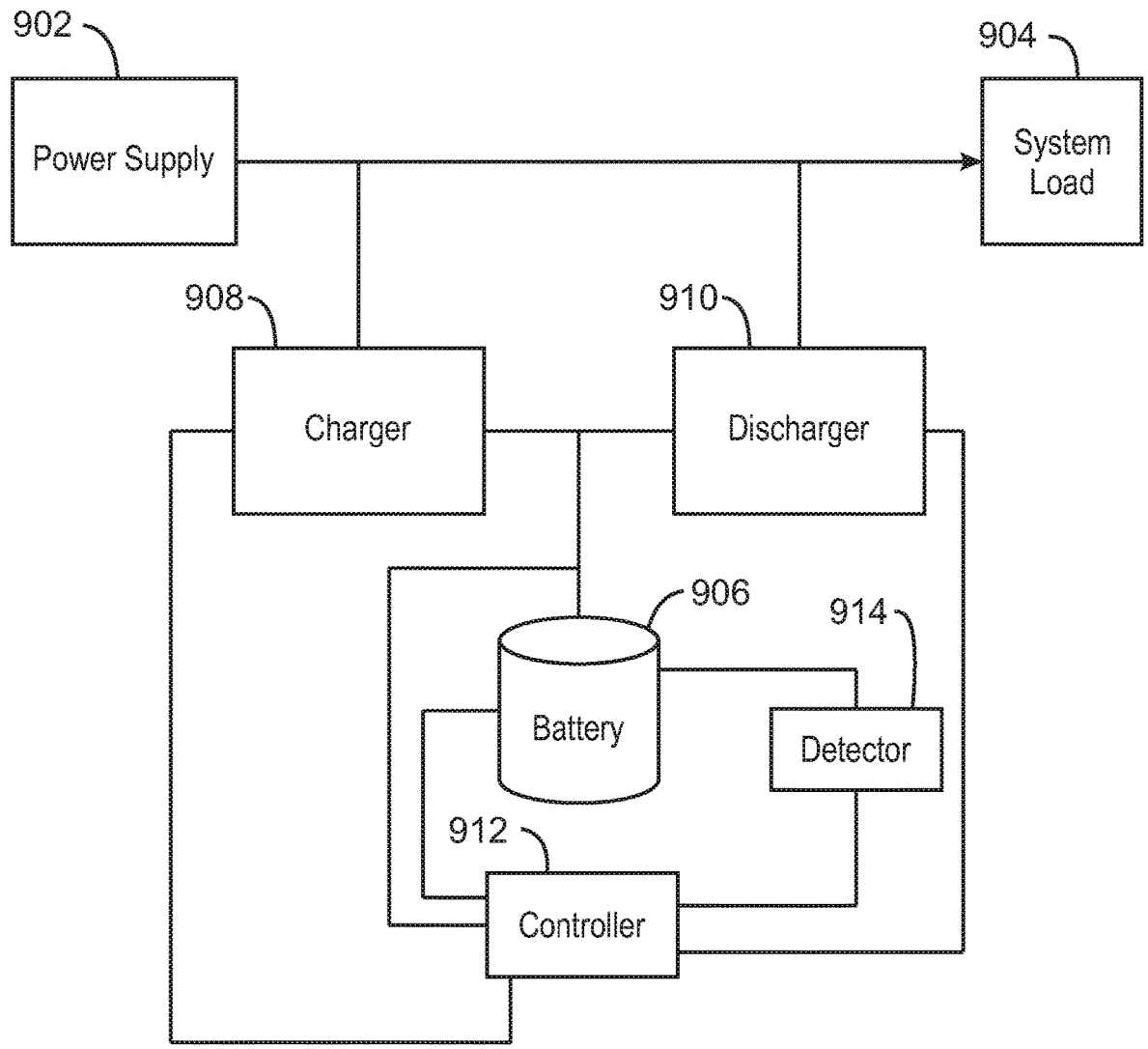
FIG. 9 illustrates a system in accordance with some embodiments.

FIG. 9 illustrates a system 900 in accordance with some embodiments. In some embodiments, system 900 is a power supply system for a mobile computing device (for example, for a laptop, a phone, or other mobile device). In some embodiments, system 900 is a power supply system (for example, a stationary power supply system such as a server power supply system). In some embodiments, system 900 includes a power supply 902 (for example, in some embodiments, a power supply unit 902), a system load 904 (for example, in some embodiments, a stationary computing system load 904 and in some embodiments, a mobile computing system load 904), a battery 906, a charger 908, a discharger 910, a controller 912, and a detector 914 (for example, a monitor or a sensor of voltage). In some embodiments, power supply 902 is a power supply unit (PSU) that can convert AC power to low-voltage regulated DC power for the internal components of a system such as a computer system. In some embodiments, battery 906 can be any one or more rechargeable energy storage device.

In some embodiments, system 900 is a hybrid power boost (HPB) charging system, and charger 908 is a HPB charger. Charger 908 can provide power to charge the battery 906. Discharger 910 can discharge battery 906 and provide power to system load 904. In some embodiments, controller 912 can be a microcontroller. In some embodiments, controller 912 can be any type of controller, and can include a processor. In some embodiments, controller 912 can be an embedded controller. In some embodiments, controller 912 is a battery controller. In some embodiments, controller 912 is one or more of a microcontroller, a processor, an application specific integrated circuit (ASIC), a digital signal processor (DSP), a field programmable gate array (FPGA), and/or a dedicated integrated circuit, etc. In some embodiments, controller 912 is the same as (or similar to) other controllers illustrated and/or described herein, and can implement any of the techniques described herein. In some embodiments, controller 912 can implement any of the techniques illustrated and/or described herein.

In some embodiments, system load 904 is a stationary computing system, such as, for example, a server or a desktop, among others. System load 904 can include a processor, a memory, one or more communication devices, etc., as well as other computing device components that make up the rest of the platform and are powered from a power supply 902 and can also be powered by a rechargeable battery such as battery 906. In some embodiments, battery 906 can provide power to system load 904 when system load 904 is at a peak load. In some embodiments, battery 906 is a lithium-ion battery pack (and/or a lithium-ion rechargeable battery). In some embodiments, other rechargeable batteries may be used in addition to battery 906 or instead of battery 906.

In some embodiments, an energy storage (for example, such as one or more capacitor) can supplement the voltage provided by battery 906 to system load 904. For example, such an energy storage can include one or more capacitors coupled together (for example, in series). For example, in some embodiments, such an energy storage can be implemented by one or more individual capacitors coupled together in parallel or in series.

Depending on the battery configuration, resistance from the battery cells to a voltage regulator (VR) input can vary. The resistance can also change based on temperature, battery wear, and variation between components. A change from in resistance can result in a considerable difference in peak power that the system can support. Different battery configurations may be used in different embodiments. For example, in some embodiments, the system may use 2S1P (2 series 1 parallel) or 2S2P (2 series 2 parallel) battery configurations.

Controller 912 can provide a charge enable signal to enable charger 908 to charge battery 906 using power from the power supply 902 (for example, when the system load 904 is not under peak load). Controller 912 can also provide a discharge enable signal to enable discharger 910 to discharge battery 906 and provide power to system load 904 (for example, when the system load 904 is under peak load). In some embodiments, controller 912 can monitor battery 906. In some embodiments, controller 912 can use monitored conditions of battery 906 as at least partial input to making decisions such as enabling charger 908, enabling discharger 910, etc. In some embodiments, for example, controller 912 can monitor conditions such as impedance of battery 906, voltage of battery 906, and/or temperature of battery 906, etc., among others. In some embodiments, detector 914 can sense current applied to the system load 904, and/or can monitor voltage of battery 906 (for example, during charging of battery 906). Controller 912 can provide a reference voltage or a reference current to detector 914. In some embodiments, detector 914 can provide voltage signals to controller 912, and controller 912 can compare a slope (or rate of change) of charging voltage of battery 906 with a reference slope (or reference rate of change) in accordance with techniques described herein. In some embodiments, controller 912 can use voltages detected by detector 914. For example, controller 912 can use voltages detected by detector 914 to detect lithium plating according to techniques described herein. For example, controller 912 can use voltages detected by detector 914 to increase, decrease, and/or stop charging current to battery 906, and/or make other decisions relating to enabling charger 908 and/or discharger 910, etc.

In some embodiments, detector 914 is a device that can detect electric current in a wire and/or can detect voltage of battery 906, and can generate a signal in response to that current (for example, can generate a monitor signal that is provided to controller 912). In some embodiments, the signal generated by detector 914 can be an analog voltage or current, or can be a digital output signal (for example, a digital output signal that switches when the sensed current or sensed voltage exceeds a certain threshold, such as a reference threshold provided to the detector by the controller 912).

In some embodiments, system 900 uses power supply 902 to provide power to the system load 904. An internal energy storage device of system 900 (for example, an internal energy storage device including battery 906) can be used so that power is utilized by system load 904 using both the power supply 902 and the battery 906 under peak load conditions. For example, the battery 906 can be kept in a state in which controller 912 controls charger 908 to keep battery 906 fully charged (for example, using power from the power supply 902). Then, when the system load 904 needs more power than the power supply 902 can supply, in addition to power provided from the power supply, system controller 912 controls discharger 910 to provide power from the battery 906 to the system load 904. Controller 912 can then later control charger 908 to charge battery 906 once the peak load condition no longer exists.

In some embodiments of FIG. 9, a stationary computing system such as a server computing system typically uses power from a power supply unit (PSU). If the stationary computing system includes an internal energy storage source such as one or more battery, the system can perform better by utilizing power from both the PSU and the battery or batteries under certain conditions such as when the system is under peak load. The battery (or batteries) can be charged to a fully charged state and used when the system needs more power than the PSU is capable of providing. At peak load, both the PSU and the battery (or batteries) can provide power to the system. After the battery or batteries is/are used to help support peak load of the system, the battery or batteries can then be fully charged so that it/they is/are ready to be used again when needed to help support peak load. However, charging a battery to a full charge (or 100% charge) each time can limit the life of the battery. In addition, even if the life of the battery is not limited, most batteries will eventually become degraded as time goes by and need to be turned off before the battery becomes unsafe.

As discussed above, a stationary computing system (such as a server) may be powered using power from a power supply unit (PSU). In addition, a stationary computing system (such as a server) may also include an internal energy storage device (for example, one or more battery such as one or more lithium ion battery). The system may perform better using power from both the power supply unit and the battery (or batteries) in accordance with some embodiments. In such a system, in order to support system peak load, parallel connected battery cells may be used.

Figure 10:
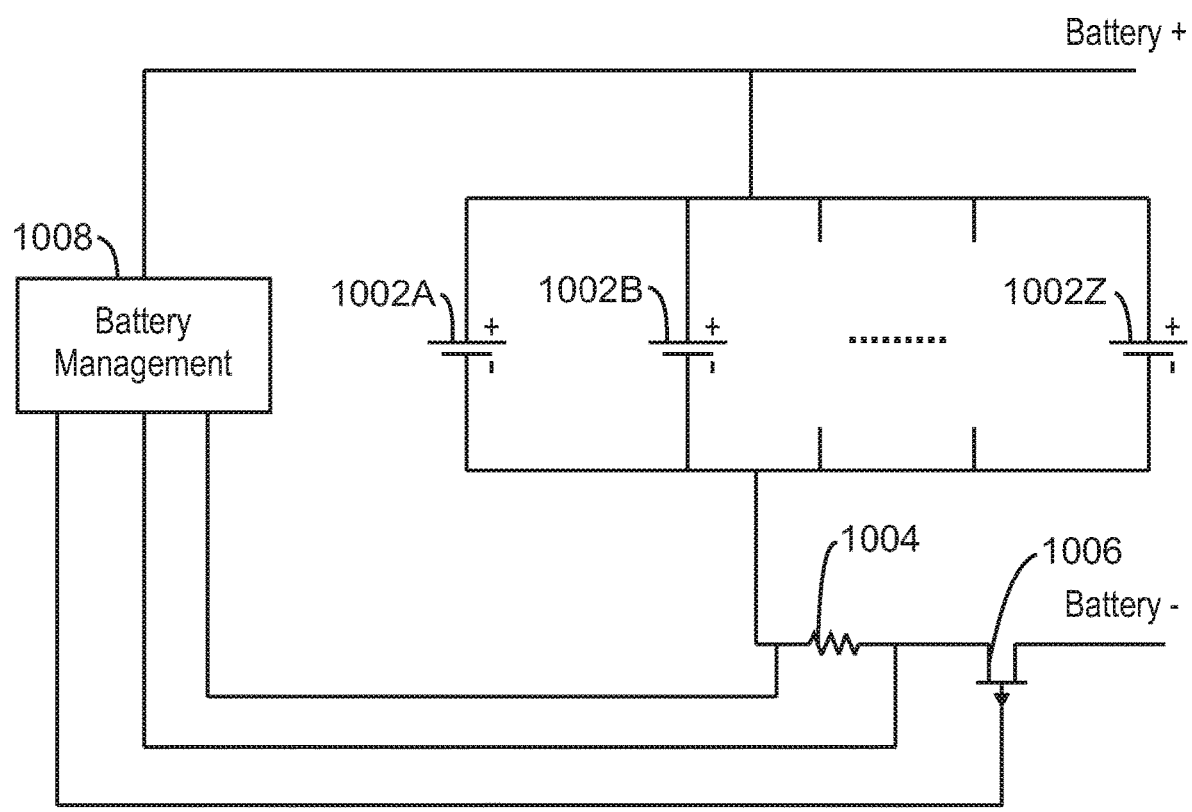
FIG. 10 illustrates a circuit in accordance with some embodiments.

FIG. 10 illustrates a system 1000. In some embodiments, FIG. 10 illustrates a battery pack circuit 1000 and/or a battery module 1000. In some embodiments, system 1000 may be a lithium ion battery pack 1000 and/or a lithium ion battery module 1000. In some embodiments, system 1000 includes a plurality of battery cells (or energy storage cells) 1002A, 1002B, . . . , 1002Z coupled in parallel, a resistor 1004, a transistor 1006 (for example, a field effect transistor 1006, a FET 1006, a switch 1006, etc.), and battery management 1008 (for example, a battery management integrated circuit 1008). In some embodiments, battery cells 1002A, 1002B, . . . , 1002Z may include any number of battery cells. In some embodiments, battery cells 1002A, 1002B, . . . , 1002Z can be used to support peak load. In some embodiments, portions or all of system 1000 (and/or battery pack circuit 1000) can be included in other batteries described and/or illustrated herein (for example, can be included in battery 702, battery 806, battery 906, etc.) In some embodiments, any of the batteries described and/or illustrated herein can be the same as or similar to system 1000. In some embodiments, battery management 1008 can be a controller implementing any of the techniques described herein. In some embodiments, battery management 1008 can be the same as or similar to any of the controllers described and/or illustrated herein (for example, can be the same as or similar to controller 706, controller 812, controller 912, etc.)

In some embodiments battery cells such as any of battery cells 1002A, 1002B, ..., 1002Z can become degraded over time, and may need to be turned off before the battery becomes unsafe. In some embodiments, system 1000 may include two or three battery cells if system 1000 is a battery pack for consumer electronics (for example, a lithium ion battery pack for consumer electronics such as a personal computer). In some embodiments, battery manager 1008 may stop charging and discharging when the total battery capacity of the battery cells is degraded to a certain level. This may be accomplished, for example, by monitoring the total battery including all of the battery cells 1002A, 1002B, ..., 1002Z rather than monitoring the individual battery cells 1002A, 1002B, ..., 1002Z. The total battery capacity may be monitored, for example, by sensing current across resistor 1004. Such a system 1000 may be a good option for battery packs with a small number of cells connected in parallel (for example, two or three cells connected in parallel), since even if one cell is substantially degraded, the total battery capacity may be significantly affected, and such a degradation can be accurately detected by monitoring the total battery capacity. When a degradation is detected based on monitoring the total battery capacity, the battery manager 1008 can be used to control transistor 1006 to turn off the entire battery pack, for example.

While system 1000 may be a good system for a battery pack with a small number of battery cells 1002A, 1002B, ..., 1002Z, it may not be good for a battery pack with a larger number of battery cells 1002A, 1002B, ..., 1002Z. In a stationary computing system (for example, a server system), it is advantageous to use a large number of battery cells that are connected in parallel (for example, in some embodiments, tens of battery cells connected in parallel) in order to support a higher peak load, for example. In such a system 1000 in which a large number of battery cells 1002A, 1002B, ..., 1002Z are connected in parallel, it is difficult to detect one degraded battery cell among the large number of parallel connected battery cells using a system monitoring total battery capacity. Such a system may create a safety issue if degraded battery cells are not able to be detected and removed from the battery pack. In some embodiments, individual battery cells are monitored (for example, individual battery cells monitored to detect degradation of the individual battery cell). In some embodiments, a degraded battery cell from a number of parallel connected battery cells may be detected and separated from the other battery cells.

In some embodiments, each of a plurality of battery cells connected in parallel may have a corresponding transistor (for example, a field effect transistor) in its current path. These transistors may be used to help determine a high battery impedance of each of the battery cells in order to detect if the corresponding battery cell is degraded to an unsafe level. In some embodiments, a disconnect switch may be used to help determine the high impedance and degraded battery cell (for example, a disconnect switch such as a relay, transistor, etc. in the current path of each battery cell). In some embodiments, for example, a battery cell may be detected as being degraded if that cell reaches a safety threshold impedance (for example, has an impedance that it twice the impedance of the original battery cells). If a battery cell is determined as having a high impedance, the transistor, relay, switch, etc. in the battery cell path with the high impedance that has reached or exceeded the safety threshold impedance may be turned off to effectively remove the degraded battery cell from the battery pack. This may be implemented in a way that the remaining battery cells that have not reached or exceeded the safety threshold impedance remains in the battery pack to continue to contribute to the overall battery voltage.

In some embodiments, a safe battery pack with a large number of parallel connected battery cells may be used. In addition, a mean-time-to-failure of the overall battery pack can be safely extended even when some battery cells have degraded by electrically removing (and/or electrically separating) degraded cells from the circuit. In some embodiments, spare battery cell architectures may be implemented to lower total cost of ownership of the battery pack.

Figure 11:
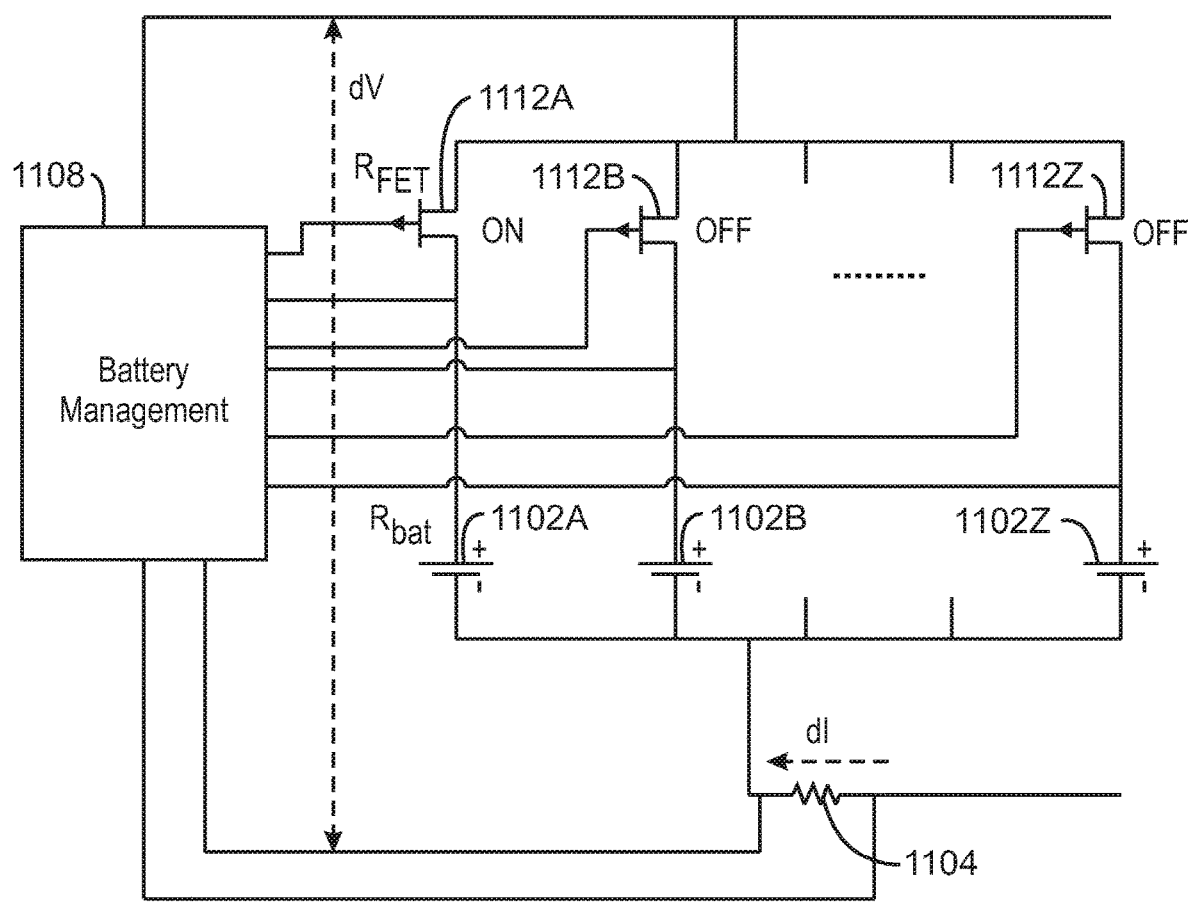
FIG. 11 illustrates a circuit in accordance with some embodiments.

FIG. 11 illustrates a system 1100. In some embodiments, FIG. 11 illustrates a battery pack circuit 1100 and/or a battery module 1100. In some embodiments, system 1100 may be a lithium ion battery pack 1100 and/or a lithium ion battery module 1100. In some embodiments, system 1100 includes a plurality of battery cells 1102A, 1102B, ..., 1102Z coupled in parallel, a resistor 1104, battery management 1108 (for example, a battery management integrated circuit 1108), and a plurality of transistors 1112A, 1112B, ..., 1112Z respectively connected in a current path of a corresponding one of the battery cells (for example, field effect transistors, FETs, switches, relays, etc.) In some embodiments, battery cells 1102A, 1102B, ..., 1102Z may include any number of battery cells. In some embodiments, battery cells 1102A, 1102B, ..., 1102Z can be used to support peak load. In some embodiments, portions or all of system 1100 (and/or battery pack circuit 1100) can be included in other batteries described and/or illustrated herein (for example, can be included in battery 702, battery 806, battery 906, etc.) In some embodiments, any of the batteries described and/or illustrated herein can be the same as or similar to system 1100. In some embodiments, battery management 1108 can be a controller implementing any of the techniques described herein. In some embodiments, battery management 1108 can be the same as or similar to any of the controllers described and/or illustrated herein (for example, can be the same as or similar to controller 706, controller 812, controller 912, etc.)

In some embodiments battery cells such as any of battery cells 1102A, 1102B, ..., 1102Z can become degraded over time, and may need to be turned off before the battery becomes unsafe. In some embodiments, system 1100 may include two or three battery cells if system 1100 is a battery pack for consumer electronics (for example, a lithium ion battery pack for consumer electronics such as a personal computer). In some embodiments, system 1100 may include tens of battery cells if system 1100 is a battery pack for a stationary computing device such as a server (for example, a lithium ion battery pack for a stationary computing device such as a server). In some embodiments, system 1100 may include any number of battery cells 1102A, 1102B, ..., 1102Z.

In some embodiments, each battery cell 1102A, 1102B, ..., 1102Z may be individually monitored in order to detect degradation of the individual battery cell. In some embodiments, each battery cell 1102A, 1102B, ..., 1102Z includes a respective corresponding field effect transistor (FET) 1112A, 1112B, ..., 1112Z in its current path. Battery impedance may be calculated for each battery cell 1102A, 1102B, ..., 1102Z, and the corresponding FET 1112A, 1112B, ..., 1112Z may be turned off to safely electrically remove (and/or electrically separate) a degraded battery cell 1102A, 1102B, ..., 1102Z from the battery pack. This may be implemented, for example, if the battery cell has a high impedance that exceeds a safety threshold due to degradation of the battery cell (for example, if a battery cell has an impedance that is twice an original impedance).

In some embodiments, battery pack 1100 (and/or battery manager 1108) periodically (and/or on an ongoing basis) determines (for example, during battery charge and/or during battery discharge) any battery cells 1102A, 1102B, . . . , 1102Z that have degraded (for example, by measuring an impedance of each battery cell and comparing the impedance with a safety threshold impedance). This determination may be implemented periodically using any period (for example, may be implemented weekly or monthly in some embodiments, but is not limited to a certain period). For example, in some embodiments, it may be implemented more frequently or less frequently, or on a constant basis.

For example, in some embodiments, to determine degrade battery cells, battery manager 1108 turns on the FET of one cell (for example, as illustrated in FIG. 11, turns on FET 1112A), and turns off FETs of all other cells (for example, as illustrated in FIG. 11, turns off FETs 1112B, . . . , 1112Z). Battery manager 1108 then monitors a voltage change dV (dV=dI*R) during discharge and/or charge, where dI is current change and R is impedance of the battery ($R_{bat}$) and impedance of the FET ($R_{FET}$). Since dI is monitored by the battery management 1108, and impedance of the FET ($R_{FET}$) is known, battery impedance ($R_{bat}$) can be calculated by $R_{bat}=dV/dI-R_{FET}$. Then the FET of the next cell is turned on and all other FETs are turned off, and the impedance of the next cell is calculated in the same manner. This process is then repeated for all of the battery cells to determine which battery cells (if any) should be electrically removed (and/or electrically separated) from the battery pack by turning off the corresponding FET.

System 1100 may be safely used in a system using a battery pack with a small number of battery cells 1102A, 1102B, . . . , 1102Z, and may also be safely used in a system using a battery pack with a larger number of battery cells 1102A, 1102B, . . . , 1102Z (for example, in a system with many battery cells connected in parallel such as in a battery pack in a stationary computing system used to support a higher peak load, or in a system with many battery cells used for other implementations such as electric car battery packs, for example.

Figure 12:
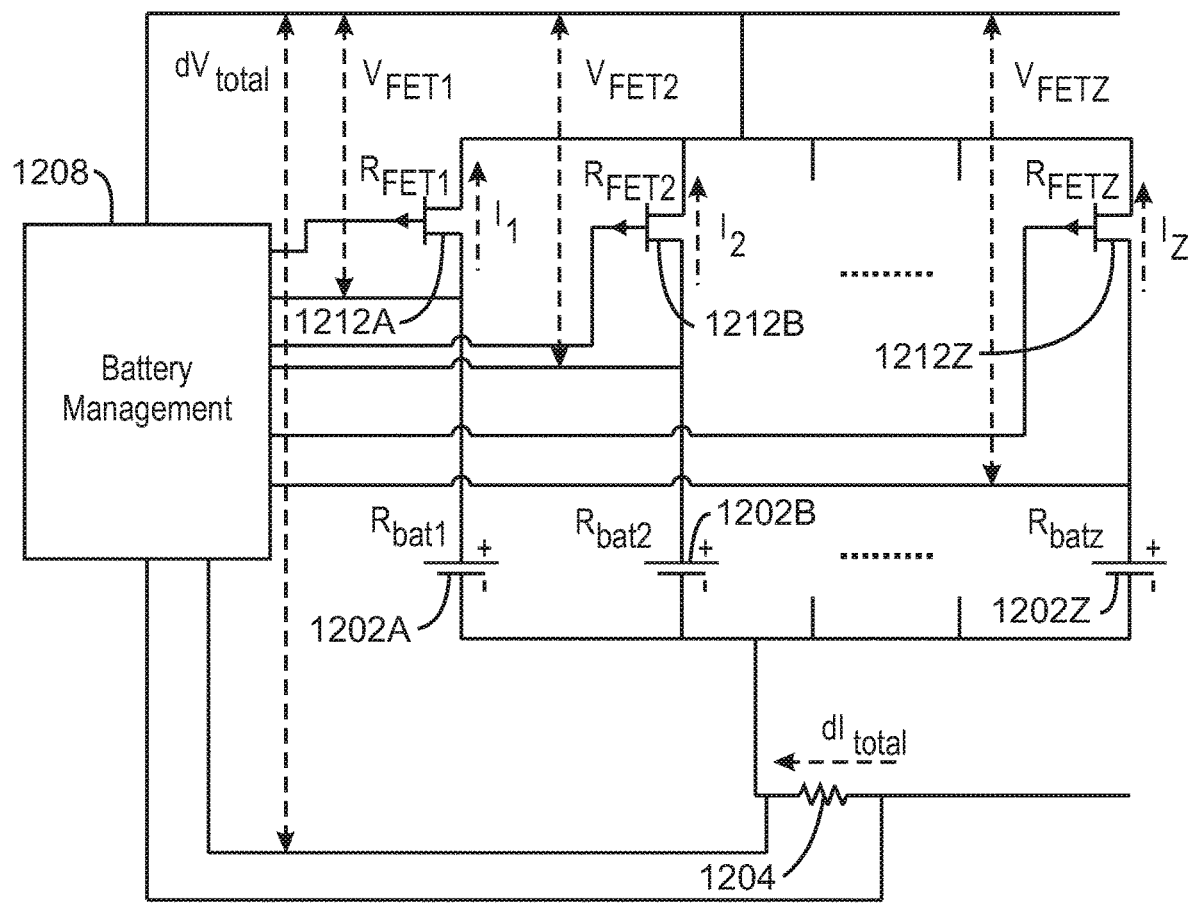
FIG. 12 illustrates a circuit in accordance with some embodiments.

FIG. 12 illustrates a system 1200. In some embodiments, FIG. 12 illustrates a battery pack circuit 1200 and/or a battery module 1200. In some embodiments, system 1200 may be a lithium ion battery pack 1200 and/or a lithium ion battery module 1200. In some embodiments, system 1200 includes a plurality of battery cells 1202A, 1202B, . . . , 1202Z coupled in parallel, a resistor 1204, battery management 1208 (for example, a battery management integrated circuit 1208), and a plurality of transistors 1212A, 1212B, . . . , 1212Z respectively connected in a current path of a corresponding one of the battery cells (for example, field effect transistors, FETs, switches, relays, etc.) In some embodiments, battery cells 1202A, 1202B, . . . , 1202Z may include any number of battery cells. In some embodiments, battery cells 1202A, 1202B, . . . , 1202Z can be used to support peak load. In some embodiments, portions or all of system 1200 (and/or battery pack circuit 1200) can be included in other batteries described and/or illustrated herein (for example, can be included in battery 702, battery 806, battery 906, etc.) In some embodiments, any of the batteries described and/or illustrated herein can be the same as or similar to system 1200. In some embodiments, battery management 1208 can be a controller implementing any of the techniques described herein. In some embodiments, battery management 1208 can be the same as or similar to any of the controllers described and/or illustrated herein (for example, can be the same as or similar to controller 706, controller 812, controller 912, etc.)

In some embodiments battery cells such as any of battery cells 1202A, 1202B, . . . , 1202Z can become degraded over time, and may need to be turned off before the battery becomes unsafe. In some embodiments, system 1200 may include two or three battery cells if system 1200 is a battery pack for consumer electronics (for example, a lithium ion battery pack for consumer electronics such as a personal computer). In some embodiments, system 1200 may include tens of battery cells if system 1200 is a battery pack for a stationary computing device such as a server (for example, a lithium ion battery pack for a stationary computing device such as a server). In some embodiments, system 1200 may include any number of battery cells 1202A, 1202B, . . . , 1202Z.

In some embodiments, each battery cell 1202A, 1202B, . . . , 1202Z may be individually monitored in order to detect degradation of the individual battery cell. In some embodiments, each battery cell 1202A, 1202B, . . . , 1202Z includes a respective corresponding field effect transistor (FET) 1212A, 1212B, . . . , 1212Z in its current path. Battery impedance may be calculated for each battery cell 1202A, 1202B, . . . , 1202Z, and the corresponding FET 1212A, 1212B, . . . , 1212Z may be turned off to safely electrically remove (and/or electrically separate) a degraded battery cell 1202A, 1202B, . . . , 1202Z from the battery pack. This may be implemented, for example, if the battery cell has a high impedance that exceeds a safety threshold due to degradation of the battery cell (for example, if a battery cell has an impedance that is twice an original impedance).

In some embodiments, battery pack 1200 (and/or battery manager 1208) periodically (and/or on an ongoing basis) determines (for example, during battery charge and/or during battery discharge) any battery cells 1202A, 1202B, . . . , 1202Z that have degraded (for example, by measuring an impedance of each battery cell and comparing the impedance with a safety threshold impedance). This determination may be implemented periodically using any period (for example, may be implemented weekly or monthly in some embodiments, but is not limited to a certain period). For example, in some embodiments, it may be implemented more frequently or less frequently, or on a constant basis.

For example, in some embodiments, to determine degrade battery cells, while all FETs 1212A, 1212B, . . . , 1212Z are on, battery management 1208 monitors a voltage drop of each FET (for example, voltage drops $V_{FET1}, V_{FET2}, \ldots, V_{FETZ}$). In some embodiments, while all FETs 1212A, 1212B, . . . , 1212Z are on, battery management 1208 monitors a voltage drop of each FET (for example, voltage drops $V_{FET1}, V_{FET2}, \ldots, V_{FETZ}$) during battery discharge and/or during battery charge. Battery impedance for each of the battery cells 1202A, 1202B, . . . , 1202Z ($R_{bat1}, R_{bat2}, \ldots, R_{batZ}$) may be calculated by battery manager 1208, for example, using the following equations 1-5, where FET impedance ($R_{FET1}, R_{FET2}, \ldots, R_{FETZ}$) is known, and where voltage drop at each FET ($V_{FETX}$), total voltage change ($dV_{total}$) during current change ($dI_{total}$), and current flow for each battery ($I_1, I_1, \ldots, I_1$) can all be monitored by battery manager 1208.

$$V_{FETX}=I_X*R_{FETX}(X=1,2,\ldots,Z) \quad \text{(EQUATION 1)}$$

$$dV_{total}=dI_{total}*R_{total} \quad \text{(EQUATION 2)}$$

$$1/R_{total}=1/R_1+1/R_2+\ldots+1/R_Z \quad \text{(EQUATION 3)}$$

$$R_X=R_{batX}+R_{FETX}(X=1,2,\ldots,Z) \quad \text{(EQUATION 4)}$$

$$I_1R_1=I_2R_2=\ldots=I_ZR_Z \quad \text{(EQUATION 5)}$$

System 1200 may be safely used in a system using a battery pack with a small number of battery cells 1202A, 1202B, . . . , 1202Z, and may also be safely used in a system using a battery pack with a larger number of battery cells 1202A, 1202B, . . . , 1202Z (for example, in a system with many battery cells connected in parallel such as in a battery pack in a stationary computing system used to support a higher peak load, or in a system with many battery cells used for other implementations such as electric car battery packs, for example.

In some embodiments, battery impedance can be determined for each separate battery cell. Degraded battery cells can be detected by comparing the determined impedance for a battery cell with a safety threshold impedance. In this manner, unsafe battery cells may be identified. The unsafe battery cells may be electrically removed (and/or electrically separated) from the battery pack (for example, by turning off a transistor such as a FET or opening a switch that is in the current path of the unsafe battery cell). In some embodiments, an unsafe situation may be avoided while electrically disconnecting the degraded battery cell from the battery (or battery pack) while still allowing the remainder of the battery (or battery pack) to be safely used. This can help extend mean-time-failure of the battery (or battery pack), and can lower a cost of ownership of the battery (or battery pack).

In some embodiments, detection and/or separation of degraded battery cells may be implemented (for example, during battery charge and/or during battery discharge). This may be implemented on an ongoing and/or on a periodic basis. In some embodiments, a notification may be provided to a user that one or more particular individual battery cell has degraded, has been electrically removed (or separated) from the other battery cells, and/or needs to be replaced. In some embodiments, a controller (such as, for example, a battery management controller such as battery manager 1008, 1108, and/or 1208) may be used to selectively control which battery cells in a battery pack are electrically connected with the other battery cells of the battery pack and which are not (for example, to selectively control which battery cells in a battery pack are connected in parallel with each other).

In some embodiments, detection and/or separation of degraded battery cells may be implemented in a memory space of a system or in a battery pack. Although it is illustrated herein as being included in battery management of a battery pack, for example, if may also be implemented in other places. For example, in some embodiments, detection and/or separation of degraded battery cells may be implemented in a remote system that controls any of the systems illustrated and/or described herein, for example.

In some embodiments, detection and/or separation of degraded battery cells may use information from an integrated circuit (IC) in a battery back (for example, from a fuel gauging IC), and/or may use information from a remote system or a local system, etc. In some embodiments, detection and/or separation of degraded battery cells may be implemented in embedded firmware, a field programmable gate array (FPGA), a discrete application specific integrated circuit (ASIC), etc.

In some embodiments, detection and/or separation of degraded battery cells may be implemented in any system including an energy storage device (such as, for example, a battery, a lithium ion battery, etc.) In some embodiments, detection and/or separation of degraded battery cells may be implemented in a stationary system, a server, a car, a robot, and/or a medical device, among others.

In some embodiments, detection and/or separation of degraded battery cells may be implemented using impedance that includes an ohmic portion and/or a polarization portion.

In some embodiments, detection and/or separation of degraded battery cells has been described and/or illustrated herein as being implemented with a 1S×P battery. However, in some embodiments, detection and/or separation of degraded battery cells may be implemented with a multi-S×P battery, for example.

In some embodiments, detection and/or separation of degraded battery cells may be implemented where a disconnect switch, transistor, FET, etc. is connected to either the battery anode or the battery cathode (for example, to electrically remove and/or separate the degraded battery cell).

In some embodiments, techniques described herein can be implemented in a system, memory space of a system, in a controller, in a memory space of a controller in a computing system, and/or in a battery pack, for example. In some embodiments, techniques described herein can be implemented in a remote system that is remote from the system load. Such a remote system can send charge voltage control to the data center to charge the battery accordingly. The remote system could be in a host that is on-site, or in any remote location. In some embodiments, techniques described herein can be implemented based on information from a remote integrated circuit (IC), a battery pack and/or from an IC of a battery pack (for example, in a fuel gauging IC).

Implementations using one battery are shown and described herein in some embodiments. However, in some embodiments, a battery as used herein can include one battery, multiple batteries connected in parallel, multiple batteries connected in series, one or more 1S battery, one or more 2S battery, one or more other multi-S battery, etc. In some embodiments, a battery as used herein can be a lithium ion battery with $LiCoO_2$ cathode and graphic anode. In some embodiments, a battery as used herein is applicable to other chemistries.

In some embodiments, techniques illustrated and/or described herein may be implemented in a memory space of the system. In some embodiments, techniques illustrated and/or described herein may be implemented in a battery pack. In some embodiments, techniques illustrated and/or described herein may be implemented in a remote system that controls a system with the battery, including any of the systems described and/or illustrated herein.

In some embodiments, techniques illustrated and/or described herein may be based on information from an integrated circuit (IC) in a battery pack (for example, from a fuel gauging IC).

In some embodiments, techniques illustrated and/or described herein may be implemented in hardware, software, in firmware, and/or in any combination of hardware, software, and/or firmware. In some embodiments, techniques illustrated and/or described herein may be implemented in one or more field programmable gate array (FPGA) device, an application specific integrated circuit (ASIC), etc., and/or in other devices.

In some embodiments, systems illustrated and/or described herein may be stationary systems. In some embodiments, systems illustrated and/or described herein may be portable systems. In some embodiments, systems illustrated and/or described herein may be included in a car, a robot, a medical device, and/or other systems. In some embodiments, systems illustrated and/or described herein may be included in any system that has an energy storage device and/or a battery.

Some embodiments relate to use with a 1S battery. Some embodiments relate to a multi-S battery (for example, a 2S battery, a 4S battery, etc.)

In some embodiments, a battery may be a lithium ion battery (for example, a Li-ion battery with $LiCoO_2$ cathode and graphite anode). In some embodiments, a battery may be a battery with other chemistries.

Figure 13:
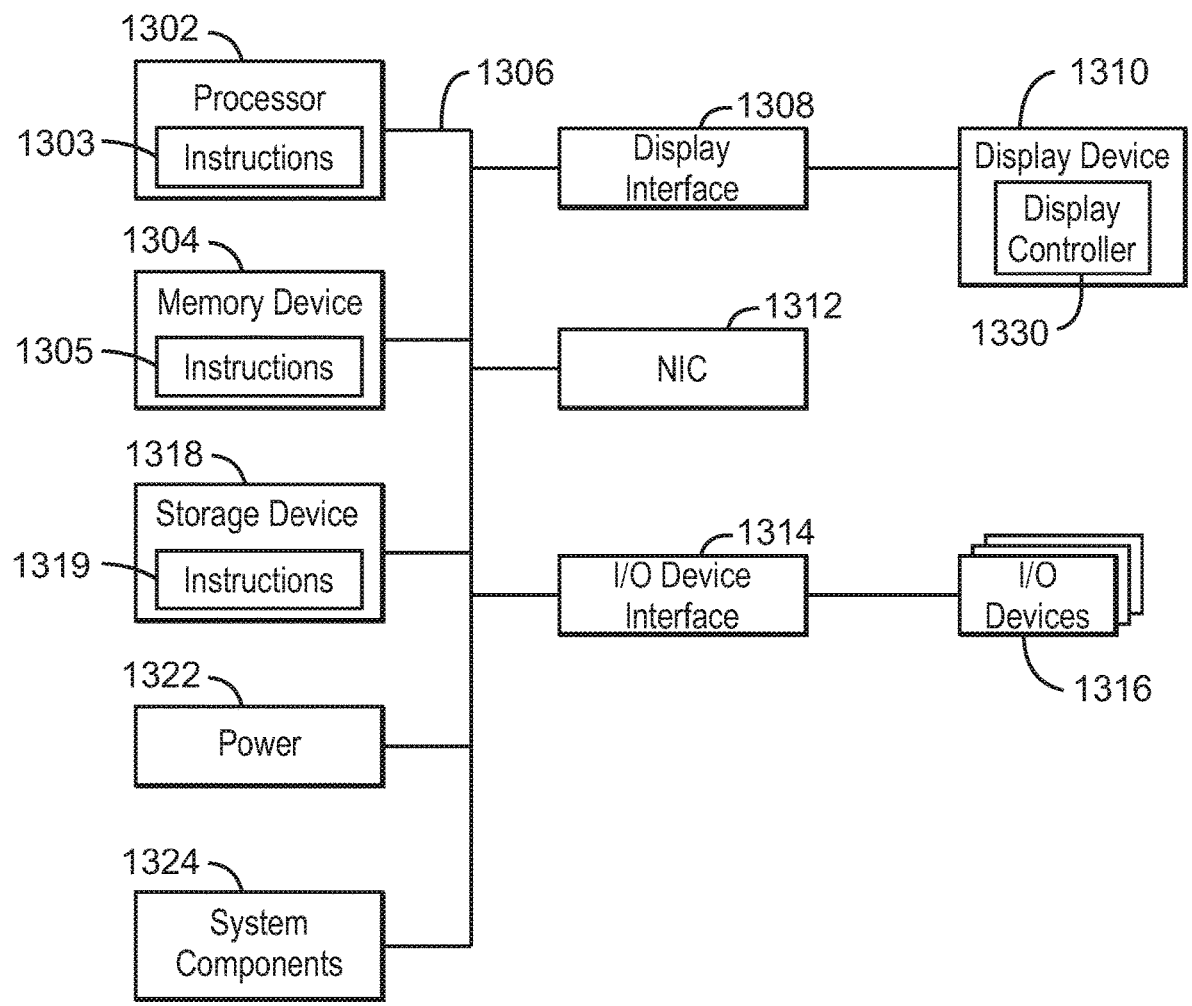
FIG. 13 illustrates a computing system in accordance with some embodiments.

FIG. 13 is a block diagram of an example of a computing device 1300 in accordance with some embodiments. In some embodiments, computing device 1300 may be a computing device including one or more elements of system 700, system 800, system 900, system 1000, system 1100, and/or system 1200. For example, in some embodiments, computing device 1300 can implement any of the techniques illustrated and/or described herein. In some embodiments, one or more elements of computing device 1300 can be included in controller 706, controller 812, controller 912, battery management 1008, battery management 1108, and/or battery management 1208, etc. In some embodiments, computing device 1300 can implement flow 600. In some embodiments, computing device 1300 may provide any techniques or functions illustrated and/or described herein.

In some embodiments, functions of computing device 1300 can include, for example, detection and/or separation of degraded battery cell, fast battery charging with lithium plating detection and/or avoidance, and/or any other techniques described and/or illustrated herein, etc., according to some embodiments. In some embodiments, any portion of the flow, circuits or systems illustrated in any one or more of the figures, and any of the embodiments illustrated and/or described herein can be included in or be implemented by computing device 1300. The computing device 1300 may be, for example, a computing device, a controller, a control unit, an application specific controller, and/or an embedded controller, among others.

The computing device 1300 may include a processor 1302 that is adapted to execute stored instructions (for example, instructions 1303), as well as a memory device 1304 (or storage 1304) that stores instructions 1305 that are executable by the processor 1302. The processor 1302 can be a single core processor, a multi-core processor, a computing cluster, or any number of other configurations. For example, processor 1302 can be an Intel® processor such as an Intel® Celeron, Pentium, Core, Core i3, Core i5, or Core i7 processor. In some embodiments, processor 1302 can be an Intel® x86 based processor. In some embodiments, processor 1302 can be an ARM based processor. The memory device 1304 can be a memory device or a storage device, and can include volatile storage, non-volatile storage, random access memory, read only memory, flash memory, or any other suitable memory or storage systems. The instructions that are executed by the processor 1302 may also be used to implement detection and/or separation of degraded battery cell, and/or fast battery charging with lithium plating detection and/or avoidance, and/or any other techniques, etc. as illustrated and/or described in this specification. In some embodiments, processor 1302 may include the same or similar features or functionality as, for example, various controllers or agents in this disclosure.

The processor 1302 may also be linked through the system interconnect 1306 (e.g., PCI®, PCI-Express®, NuBus, etc.) to a display interface 1308 adapted to connect the computing device 1300 to a display device 1310. The display device 1310 may include a display controller 1330. Display device 1310 may also include a display screen that is a built-in component of the computing device 1300. The display device may also include a computer monitor, television, or projector, among others, that is externally connected to the computing device 1300. In some embodiments, computing device 1300 does not include a display interface or a display device.

In some embodiments, the display interface 1308 can include any suitable graphics processing unit, transmitter, port, physical interconnect, and the like. In some examples, the display interface 1308 can implement any suitable protocol for transmitting data to the display device 1310. For example, the display interface 1308 can transmit data using a high-definition multimedia interface (HDMI) protocol, a DisplayPort protocol, or some other protocol or communication link, and the like In addition, a network interface controller (also referred to herein as a NIC) 1312 may be adapted to connect the computing device 1300 through the system interconnect 1306 to a network (not depicted). The network (not depicted) may be a cellular network, a radio network, a wide area network (WAN), a local area network (LAN), or the Internet, among others.

The processor 1302 may be connected through system interconnect 1306 to an input/output (I/O) device interface 1314 adapted to connect the computing host device 1300 to one or more I/O devices 1316. The I/O devices 1316 may include, for example, a keyboard or a pointing device, where the pointing device may include a touchpad or a touchscreen, among others. The I/O devices 1316 may be built-in components of the computing device 1300, or may be devices that are externally connected to the computing device 1300.

In some embodiments, the processor 1302 may also be linked through the system interconnect 1306 to a storage device 1318 that can include a hard drive, a solid-state drive (SSD), a magnetic drive, an optical drive, a USB flash drive, an array of drives, or any other type of storage, including combinations thereof. In some embodiments, the storage device 1318 can include any suitable applications that can be used by processor 1302 to implement any of the techniques illustrated and/or described herein. In some embodiments, storage 1318 stores instructions 1319 that are executable by the processor 1302. In some embodiments, the storage device 1318 can include a basic input/output system (BIOS).

In some embodiments, a power device 1322 is provided. For example, in some embodiments, power device 1322 can provide peak power support, battery charge termination voltage adjustment, charging, power, power supply, power delivery, power management, peak power management, under-voltage protection, power control, voltage regulation, power generation, voltage generation, power protection, and/or voltage protection, etc. Power 1322 can also include any of the techniques illustrated and/or described herein, including, for example, detection and/or separation of degraded battery cell, and/or fast battery charging with lithium plating detection and/or avoidance, and/or any other techniques. In some embodiments, power 1322 can include one or more sources of power supply such as one or more power supply units (PSUs). In some embodiments, power 1322 can be a part of system 1300, and in some embodiments, power 1322 can be external to the rest of system 1300. In some embodiments, power 1322 can provide any of peak power supply support, battery charge termination voltage adjustment, charging, discharging, power, power supply, power delivery, power management, peak power management, under-voltage protection, power control, voltage regulation, power generation, voltage generation, power protection, or voltage protection, power control, power adjustment, or any other techniques such as those illustrated and/or described herein. For example, in some embodiments, power 1322 can provide any of the techniques as described in reference to or illustrated in any of the drawings herein, including detection and/or separation of degraded battery cell, and/or fast battery charging with lithium plating detection and/or avoidance, and/or any other techniques.

FIG. 13 also illustrates system components 1324. In some embodiments, system components 1324 can include any of display, camera, audio, storage, modem, or memory components, or any additional system components. In some embodiments, system components 1324 can include any system components for which power, voltage, power management, etc. can be implemented according to some embodiments as illustrated and/or described herein.

It is to be understood that the block diagram of FIG. 13 is not intended to indicate that the computing device 1300 is to include all of the components shown in FIG. 13 in all embodiments. Rather, the computing device 1300 can include fewer or additional components not illustrated in FIG. 13 (e.g., additional memory components, embedded controllers, additional modules, additional network interfaces, etc.). Furthermore, any of the functionalities of power device 1322 may be partially, or entirely, implemented in hardware or in a processor such as processor 1302. For example, the functionality may be implemented with an application specific integrated circuit, logic implemented in an embedded controller, or in logic implemented in the processor 1302, among others. In some embodiments, the functionalities of power device 1322 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 1322 can be implemented with an integrated circuit.

Figure 14:
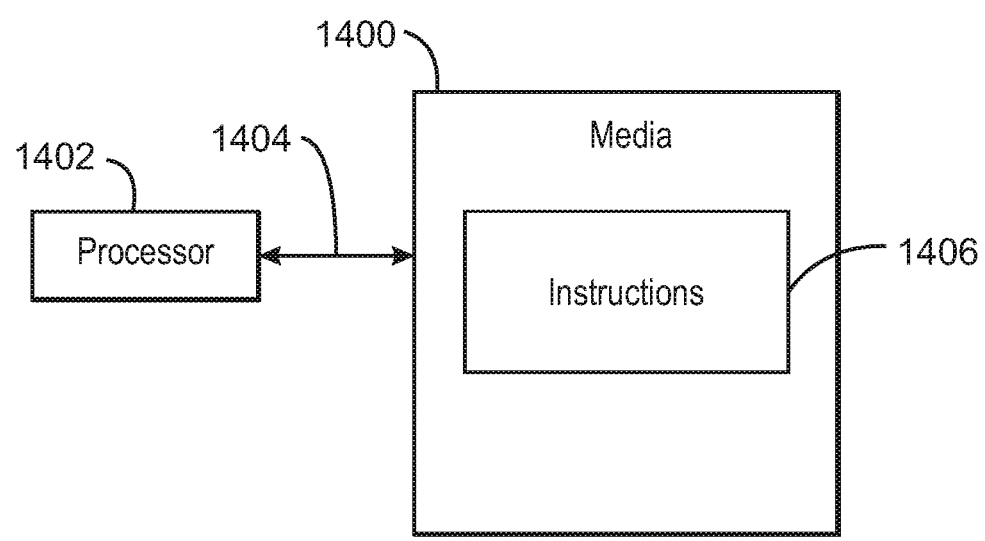
FIG. 14 illustrates one or more processors and one or more media in accordance with some embodiments.

FIG. 14 is a block diagram of an example of one or more processors 1402 and one or more tangible, non-transitory computer readable media 1400 for detection and/or separation of degraded battery cell, and/or fast battery charging with lithium plating detection and/or avoidance, and/or any other techniques, etc. The one or more tangible, non-transitory, computer-readable media 1400 may be accessed by the processor(s) 1402 over a computer interconnect 1404. Furthermore, the one or more tangible, non-transitory, computer-readable media 1400 may include instructions (or code) 1406 to direct the processor(s) 1402 to perform operations as illustrated and/or described herein. In some embodiments, processor 1402 is one or more processors. In some embodiments, processor(s) 1402 can perform some or all of the same or similar functions that can be performed by other elements illustrated and/or described herein using instructions (code) 1406 included on media 1400 (for example, some or all of the functions or techniques illustrated in and/or described in reference to any of FIGS. 1-13). In some embodiments, one or more of processor(s) 1402 may include the same or similar features or functionality as, for example, various controllers, units, or agents, etc. illustrated and/or described in this disclosure. In some embodiments, one or more processor(s) 1402, interconnect 1404, and/or media 1400 may be included in computing device 1300.

Various components discussed in this specification may be implemented using software components. These software components may be stored on the one or more tangible, non-transitory, computer-readable media 1400, as indicated in FIG. 14. For example, detection and/or separation of degraded battery cell, and/or fast battery charging with lithium plating detection and/or avoidance, and/or any other techniques, etc. may be adapted to direct the processor(s) 1402 to perform one or more of any of the operations described in this specification and/or in reference to the drawings.

It is to be understood that any suitable number of software components may be included within the one or more tangible, non-transitory computer-readable media 1400. Furthermore, any number of additional software components shown or not shown in FIG. 14 may be included within the one or more tangible, non-transitory, computer-readable media 1400, depending on the specific application.

The various techniques and/or operations described herein (for example, in reference to any one or more of FIGS. 1-13) may be performed by a control unit comprised of one or more processors, monitoring logic, control logic, software, firmware, agents, controllers, logical software agents, system agents, and/or other modules. For example, in some embodiments, some or all of the techniques and/or operations illustrated and/or described herein may be implemented by a system agent. Due to the variety of modules and their configurations that may be used to perform these functions, and their distribution through the system and/or in a different system, they are not all specifically illustrated in their possible locations in the figures.

In some embodiments, any of the techniques illustrated and/or described herein may be combined. For example, in some embodiments, any of the techniques described herein may be combined and implemented in the same system, method, computing device, instructions stored on one or more media, etc. For example, in some embodiments, techniques relating to detection and/or separation of degraded battery cells as described and/or illustrated herein may be combined with techniques relating to fast battery charging and/or lithium plating avoidance and/or detection as described and/or illustrated herein. For example, any of the techniques, including but not limited to techniques relating to detection and/or separation of degraded battery cells as described and/or illustrated herein, techniques relating to fast battery charging and/or lithium plating avoidance and/or detection as described and/or illustrated herein, control, detect, monitor, charge, discharge, battery management, etc. techniques implemented by any of systems/circuits 700, 800, 900, 1000, 1100, 1200, 1300, and/or 1400, including but not limited to detectors 704, controller 706, charger/discharger 708, controller 812, detector 814, microcontroller/processor 820, battery charger 824, battery discharger 826, energy storage charge/discharge 828, charger 908, discharger 910, controller 912, detector 914, battery manager 1008, battery manager 1108, battery manager 1208, processor 1302, power 1322, processor 1402, etc. may be combined into the same system, processor, controller, detector, battery manager, etc. Additionally, in some embodiments, any portion of the batteries described and/or illustrated herein (for example, battery 100, battery 200, battery 702, battery 806, battery 906, battery cell 1002A, battery cell 1002B, . . . , battery cell 1002Z, battery cell 1102A, battery cell 1102B, . . . , battery cell 1102Z, battery cell 1202A, battery cell 1202B, . . . , battery cell 1202Z) may be interchangeable and/or may be the same or similar as each other. For example, any or all of battery 100, battery 200, battery 702, battery 806, and/or battery 906 may be used as a portion or all of battery cell 1002A, battery cell 1002B, . . . , battery cell 1002Z, battery cell 1102A, battery cell 1102B, . . . , battery cell 1102Z, battery cell 1202A, battery cell 1202B, . . . , and/or battery cell 1202Z. Similarly, any or all of battery cell 1002A, battery cell 1002B, . . . , battery cell 1002Z, battery cell 1102A, battery cell 1102B, . . . , battery cell 1102Z, battery cell 1202A, battery cell 1202B, . . . , and/or battery cell 1202Z may be used as a portion of any or all of battery 100, battery 200, battery 702, battery 806, and/or battery 906. In some embodiments, any portion of any or all of the batteries described and/or illustrated herein (for example, battery 100, battery 200, battery 702, battery 806, battery 906, battery cell 1002A, battery cell 1002B, . . . , battery cell 1002Z, battery cell 1102A, battery cell 1102B, . . . , battery cell 1102Z, battery cell 1202A, battery cell 1202B, . . . , battery cell 1202Z) may be included in computing device 1300 or attached to computing device 1300 (for example, may be included in power 1322).

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, an apparatus includes a controller to monitor voltage of a battery during constant current charging of the battery, and to detect lithium plating of the battery based on a rate of change of the monitored voltage of the battery during constant current charging of the battery.

Example 2 includes the subject matter of example 1. The controller is to reduce or stop charge current used to charge the battery if lithium plating is detected.

Example 3 includes the subject matter of any of examples 1-2. The monitored voltage of the battery is an open circuit voltage of the battery.

Example 4 includes the subject matter of any of examples 1-3. The rate of change is (or includes) a rate of change of the monitored voltage over a state of charge of the battery.

Example 5 includes the subject matter of any of examples 1-4. The rate of change is (or includes) a rate of change of the monitored voltage over charged capacity.

Example 6 includes the subject matter of any of examples 1-5. The controller is to control charge current to keep the battery within an allowable operation temperature.

Example 7 In some examples, a system includes a charger to charge a battery using constant current charging, and a controller to monitor voltage of the battery during the constant current charging of the battery, and to detect lithium plating of the battery based on a rate of change of the monitored voltage of the battery during constant current charging of the battery.

Example 8 includes the subject matter of example 7. The controller is to reduce or stop charge current used to charge the battery if lithium plating is detected.

Example 9 includes the subject matter of any of examples 7-8. The monitored voltage of the battery is an open circuit voltage of the battery.

Example 10 includes the subject matter of any of examples 7-9. The rate of change is a rate of change of the monitored voltage over a state of charge of the battery.

Example 11 includes the subject matter of any of examples 7-10. The rate of change is a rate of change of the monitored voltage over charged capacity.

Example 12 includes the subject matter of any of examples 7-11. The controller is to control charge current to keep the battery within an allowable operation temperature.

Example 13 In some examples, a method includes monitoring voltage of a battery during constant current charging of the battery, and detecting lithium plating of the battery based on a rate of change of the monitored voltage of the battery during constant current charging of the battery.

Example 14 includes the subject matter of example 13. The method includes reducing or stopping charge current used to charge the battery if lithium plating is detected.

Example 15 includes the subject matter of any of examples 13-14. The monitored voltage of the battery is an open circuit voltage of the battery.

Example 16 includes the subject matter of any of examples 13-15. The rate of change is a rate of change of the monitored voltage over a state of charge of the battery.

Example 17 includes the subject matter of any of examples 13-16. The rate of change is a rate of change of the monitored voltage over charged capacity.

Example 18 includes the subject matter of any of examples 13-17. The method includes controlling charge current to keep the battery within an allowable operation temperature.

Example 19 In some examples, one or more tangible, non-transitory machine readable media comprising a plurality of instructions that, in response to being executed on at least one processor, cause the at least one processor to monitor voltage of a battery during constant current charging of the battery, and to detect lithium plating of the battery based on a rate of change of the monitored voltage of the battery during constant current charging of the battery.

Example 20 includes the subject matter of example 19. The plurality of instructions, in response to being executed on at least one processor, cause the at least one processor to reduce or stop charge current used to charge the battery if lithium plating is detected.

Example 21 includes the subject matter of any of examples 19-20. The monitored voltage of the battery is an open circuit voltage of the battery.

Example 22 includes the subject matter of any of examples 19-21. The rate of change is a rate of change of the monitored voltage over a state of charge of the battery.

Example 23 includes the subject matter of any of examples 19-22. The rate of change is a rate of change of the monitored voltage over charged capacity.

Example 24 includes the subject matter of any of examples 19-23. The plurality of instructions, in response to being executed on at least one processor, cause the at least one processor to control charge current to keep the battery within an allowable operation temperature.

Example 25 In some examples, a battery module includes a plurality of battery cells connected in parallel, and a controller to determine an impedance of each of the plurality of battery cells, and to disconnect one of the plurality of battery cells from the plurality of battery cells based on a relation (or a relationship) of the impedance of the one of the plurality of battery cells with a threshold impedance (for example, a relation where the impedance of the one of the plurality of battery cells equals and/or exceeds the threshold impedance).

Example 26 includes the subject matter of example 25. For each battery cell, the battery module includes a respective switch connected in the current path of the battery cell. The controller is to selectively turn on and turn off the switch.

Example 27 includes the subject matter of any of examples 25-26. The controller is to selectively connect and disconnect each battery cell from the plurality of battery cells by controlling the respective switch.

Example 28 includes the subject matter of any of examples 25-27. Each switch is (or includes) a field effect transistor.

Example 29 includes the subject matter of any of examples 25-28. For each of the battery cells, the controller is turn on the battery cell and turn off the other battery cells, and to determine the impedance of the battery cell while the battery cell is turned on and the other battery cells are turned off.

Example 30 includes the subject matter of any of examples 25-29. The controller is to determine, while the field effect transistor of one of the battery cells is on and the field effect transistors of the other battery cells are off, a voltage drop across the field effect transistor and the battery cell, and to determine, while the field effect transistor of one of the battery cells is on and the field effect transistors of the other battery cells are off, a current flowing through the battery cell, and to determine an impedance of the battery cell based on the determined voltage drop, based on the determined current, and based on an impedance of the field effect transistor.

Example 31 includes the subject matter of any of examples 25-30. The controller is to monitor a voltage drop of each field effect transistor, and to determine an impedance of each of the plurality of battery cells based on the monitored voltage drop of the field effect transistor in the current path of the battery cell.

Example 32 In some examples, a method includes determining an impedance of each of a plurality of battery cells connected with each other in parallel, and disconnecting one of the plurality of battery cells from the plurality of battery cells based on a relation of the impedance of the one of the plurality of battery cells with a threshold impedance (for example, a relation where the impedance of the one of the plurality of battery cells equals and/or exceeds the threshold impedance).

Example 33 includes the subject matter of example 32. The method includes for each battery cell selectively turning on and selectively turning off a respective switch coupled in a current path with the battery cell to connect and disconnect the battery cell from the other battery cells.

Example 34 includes the subject matter of any of examples 32-33. The method includes selectively connecting and selectively disconnecting each battery cell from the plurality of battery cells by controlling a respective switch.

Example 35 includes the subject matter of any of examples 32-34. Each switch is (and/or includes) a field effect transistor.

Example 36 includes the subject matter of any of examples 32-35. The method includes, for each of the battery cells, turning on the battery cell and turning off the other battery cells, and determining the impedance of the battery cell while the battery cell is turned on and the other battery cells are turned off.

Example 37 includes the subject matter of any of examples 32-36. The method includes determining, while the field effect transistor of one of the battery cells is on and the field effect transistors of the other battery cells are off, a voltage drop across the field effect transistor and the battery cell, determining, while the field effect transistor of one of the battery cells is on and the field effect transistors of the other battery cells are off, a current flowing through the battery cell, and determining an impedance of the battery cell based on the determined voltage drop, based on the determined current, and based on an impedance of the field effect transistor.

Example 38 includes the subject matter of any of examples 32-37. The method includes monitoring a voltage drop of each field effect transistor, and determining an impedance of each of the plurality of battery cells based on the monitored voltage drop of the field effect transistor in the current path of the battery cell.

Example 39 In some examples, one or more tangible, non-transitory machine readable media including a plurality of instructions that, in response to being executed on at least one processor, cause the at least one processor to determine an impedance of each of a plurality of battery cells connected with each other in parallel, and to disconnect one of the plurality of battery cells from the plurality of battery cells based on a relation of the impedance of the one of the plurality of battery cells with a threshold impedance (for example, a relation where the impedance of the one of the plurality of battery cells equals and/or exceeds the threshold impedance).

Example 40 includes the subject matter of example 39. The plurality of instructions, in response to being executed on at least one processor, cause the at least one processor to, for each battery cell, selectively turn on and turn off a respective switch coupled in a current path with the battery cell to connect and disconnect the battery cell from the other battery cells.

Example 41 includes the subject matter of any of examples 39-40. The plurality of instructions, in response to being executed on at least one processor, cause the at least one processor to selectively connect and selectively disconnect each battery cell from the plurality of battery cells by controlling a respective switch.

Example 42 includes the subject matter of any of examples 39-41. Each switch is (and/or includes) a field effect transistor.

Example 43 includes the subject matter of any of examples 39-42. The plurality of instructions, in response to being executed on at least one processor, cause the at least one processor to, for each of the battery cells, turn on the battery cell and turn off the other battery cells, and determine the impedance of the battery cell while the battery cell is turned on and the other battery cells are turned off.

Example 44 includes the subject matter of any of examples 39-43. The plurality of instructions, in response to being executed on at least one processor, cause the at least one processor to determine, while the field effect transistor of one of the battery cells is on and the field effect transistors of the other battery cells are off, a voltage drop across the field effect transistor and the battery cell, to determine, while the field effect transistor of one of the battery cells is on and the field effect transistors of the other battery cells are off, a current flowing through the battery cell, and to determine an impedance of the battery cell based on the determined voltage drop, based on the determined current, and based on an impedance of the field effect transistor.

Example 45 includes the subject matter of any of examples 39-44. The plurality of instructions, in response to being executed on at least one processor, cause the at least one processor to monitor a voltage drop of each field effect transistor, and to determine an impedance of each of the plurality of battery cells based on the monitored voltage drop of the field effect transistor in the current path of the battery cell.

Example 46 includes the subject matter of any of examples 25-31. The controller (and/or a second controller) is/are to monitor voltage of a battery (and/or one or more of the battery cells) during constant current charging of the battery (and/or one or more of the battery cells), and to detect lithium plating of the battery (and/or one or more of the battery cells) based on a rate of change of the monitored voltage of the battery (and/or one or more of the battery cells) during constant current charging of the battery (and/or one or more of the battery cells).

Example 47 includes the subject matter of example 46. The controller (and/or the second controller) is/are to reduce or stop charge current used to charge the battery (and/or one or more of the battery cells) if lithium plating is detected.

Example 48 includes the subject matter of any of examples 46-47. The monitored voltage of the battery is an open circuit voltage of the battery (and/or one or more of the battery cells).

Example 49 includes the subject matter of any of examples 46-48. The rate of change is a rate of change of the monitored voltage over a state of charge of the battery (and/or one or more of the battery cells).

Example 50 includes the subject matter of any of examples 46-49. The rate of change is a rate of change of the monitored voltage over charged capacity.

Example 51 includes the subject matter of any of examples 46-50. The controller (and/or the second controller) is/are to control charge current to keep the battery (and/or one or more of the battery cells) within an allowable operation temperature.

Example 52 includes the subject matter of any of examples 25-31. The battery module includes a charger to charge a battery (and/or one or more of the battery cells) using constant current charging, and the controller (and/or a second controller) is/are to monitor voltage of the battery (and/or of one or more of the battery cells) during the constant current charging of the battery (and/or one or more of the battery cells), and detect lithium plating of the battery (and/or one or more of the battery cells) based on a rate of change of the monitored voltage of the battery (and/or one or more of the battery cells) during constant current charging of the battery (and/or one or more of the battery cells).

Example 53 includes the subject matter of example 52. The controller (and/or the second controller) is/are to reduce or stop charge current used to charge the battery (and/or one or more of the battery cells) if lithium plating is detected.

Example 54 includes the subject matter of any of examples 52-53. The monitored voltage of the battery (and/or one or more of the battery cells) is an open circuit voltage of the battery (and/or one or more of the battery cells).

Example 55 includes the subject matter of any of examples 52-54. The rate of change is a rate of change of the monitored voltage over a state of charge of the battery (and/or one or more of the battery cells).

Example 56 includes the subject matter of any of examples 52-55. The rate of change is a rate of change of the monitored voltage over charged capacity.

Example 57 includes the subject matter of any of examples 52-56. The controller (and/or the second controller) is/are to control charge current to keep the battery (and/or one or more of the battery cells) within an allowable operation temperature.

Example 58 includes the subject matter of any of examples 32-38. The method includes monitoring voltage of a battery during constant current charging of the battery, and detecting lithium plating of the battery based on a rate of change of the monitored voltage of the battery during constant current charging of the battery.

Example 59 includes the subject matter of example 58. The method includes reducing or stopping charge current used to charge the battery if lithium plating is detected.

Example 60 includes the subject matter of any of examples 58-59. The monitored voltage of the battery is an open circuit voltage of the battery.

Example 61 includes the subject matter of any of examples 58-60. The rate of change is a rate of change of the monitored voltage over a state of charge of the battery.

Example 62 includes the subject matter of any of examples 58-61. The rate of change is a rate of change of the monitored voltage over charged capacity.

Example 63 includes the subject matter of any of examples 58-62. The method includes controlling charge current to keep the battery within an allowable operation temperature.

Example 64 includes the subject matter of any of examples 39-45. The plurality of instructions, in response to being executed on at least one processor, cause the at least one processor to monitor voltage of a battery during constant current charging of the battery, and to detect lithium plating of the battery based on a rate of change of the monitored voltage of the battery during constant current charging of the battery.

Example 65 includes the subject matter of example 64. The plurality of instructions, in response to being executed on at least one processor, cause the at least one processor to reduce or stop charge current used to charge the battery if lithium plating is detected.

Example 66 includes the subject matter of any of examples 64-65. The monitored voltage of the battery is an open circuit voltage of the battery.

Example 67 includes the subject matter of any of examples 64-66. The rate of change is a rate of change of the monitored voltage over a state of charge of the battery.

Example 68 includes the subject matter of any of examples 64-67. The rate of change is a rate of change of the monitored voltage over charged capacity.

Example 69 includes the subject matter of any of examples 64-68. The plurality of instructions, in response to being executed on at least one processor, cause the at least one processor to control charge current to keep the battery within an allowable operation temperature.

Example 70 includes the subject matter of any of examples 1-12. The battery is (and/or is included in) a battery module including a plurality of battery cells connected in parallel, and the controller (and/or a second controller) to determine an impedance of each of the plurality of battery cells, and to disconnect one of the plurality of battery cells from the plurality of battery cells based on a relation of the impedance of the one of the plurality of battery cells with a threshold impedance.

Example 71 includes the subject matter of example 70. For each battery cell, a respective switch is connected in the current path of the battery cell, and the controller (and/or the second controller) is/are to selectively turn on and turn off the switch.

Example 72 includes the subject matter of any of examples 70-71. The controller (and/or the second controller) is/are to selectively connect and selectively disconnect each battery cell from the plurality of battery cells by controlling the respective switch.

Example 73 includes the subject matter of any of examples 70-72. Each switch is (and/or includes) a field effect transistor.

Example 74 includes the subject matter of any of examples 70-73. For each of the battery cells, the controller (and/or the second controller) is/are to turn on the battery cell and turn off the other battery cells, and to determine the impedance of the battery cell while the battery cell is turned on and the other battery cells are turned off.

Example 75 includes the subject matter of any of examples 70-74. The controller (and/or the second controller) is/are to determine, while the field effect transistor of one of the battery cells is on and the field effect transistors of the other battery cells are off, a voltage drop across the field effect transistor and the battery cell, to determine, while the field effect transistor of one of the battery cells is on and the field effect transistors of the other battery cells are off, a current flowing through the battery cell, and to determine an impedance of the battery cell based on the determined voltage drop, based on the determined current, and based on an impedance of the field effect transistor.

Example 76 includes the subject matter of any of examples 70-75. The controller (and/or the second controller) is/are to monitor a voltage drop of each field effect transistor, and to determine an impedance of each of the plurality of battery cells based on the monitored voltage drop of the field effect transistor in the current path of the battery cell.

Example 77 includes the subject matter of any of examples 13-18. The method includes determining an impedance of each of a plurality of battery cells connected with each other in parallel, and disconnecting one of the plurality of battery cells from the plurality of battery cells based on a relation of the impedance of the one of the plurality of battery cells with a threshold impedance.

Example 78 includes the subject matter of example 77. The method includes, for each battery cell, selectively turning on and selectively turning off a respective switch coupled in a current path with the battery cell to connect and disconnect the battery cell from the other battery cells.

Example 79 includes the subject matter of any of examples 77-78. The method includes selectively connecting and disconnecting each battery cell from the plurality of battery cells by controlling a respective switch.

Example 80 includes the subject matter of any of examples 77-79. Each switch is (and/or includes) a field effect transistor.

Example 81 includes the subject matter of any of examples 77-80. The method includes, for each of the battery cells, turning on the battery cell and turning off the other battery cells, and determining the impedance of the battery cell while the battery cell is turned on and the other battery cells are turned off.

Example 82 includes the subject matter of any of examples 77-81. The method includes determining, while the field effect transistor of one of the battery cells is on and the field effect transistors of the other battery cells are off, a voltage drop across the field effect transistor and the battery cell, determining, while the field effect transistor of one of the battery cells is on and the field effect transistors of the other battery cells are off, a current flowing through the battery cell, and determining an impedance of the battery cell based on the determined voltage drop, based on the determined current, and based on an impedance of the field effect transistor.

Example 83 includes the subject matter of any of examples 77-82. The method includes monitoring a voltage drop of each field effect transistor, and determining an impedance of each of the plurality of battery cells based on the monitored voltage drop of the field effect transistor in the current path of the battery cell.

Example 84 includes the subject matter of any of examples 19-24. The plurality of instructions, in response to being executed on at least one processor, cause the at least one processor to determine an impedance of each of a plurality of battery cells connected with each other in parallel, and to disconnect one of the plurality of battery cells from the plurality of battery cells based on a relation of the impedance of the one of the plurality of battery cells with a threshold impedance.

Example 85 includes the subject matter of example 84. The plurality of instructions, in response to being executed on at least one processor, cause the at least one processor to, for each battery cell, selectively turn on and selectively turn off a respective switch coupled in a current path with the battery cell to connect and disconnect the battery cell from the other battery cells.

Example 86 includes the subject matter of any of examples 84-85. The plurality of instructions, in response to being executed on at least one processor, cause the at least one processor to selectively connect and disconnect each battery cell from the plurality of battery cells by controlling a respective switch.

Example 87 includes the subject matter of any of examples 84-86. Each switch is (and/or includes) a field effect transistor.

Example 88 includes the subject matter of any of examples 84-87. The plurality of instructions, in response to being executed on at least one processor, cause the at least one processor to, for each of the battery cell, turn on the battery cell and turn off the other battery cells, and determine the impedance of the battery cell while the battery cell is turned on and the other battery cells are turned off.

Example 89 includes the subject matter of any of examples 84-88. The plurality of instructions, in response to being executed on at least one processor, cause the at least one processor to determine, while the field effect transistor of one of the battery cells is on and the field effect transistors of the other battery cells are off, a voltage drop across the field effect transistor and the battery cell, to determine, while the field effect transistor of one of the battery cells is on and the field effect transistors of the other battery cells are off, a current flowing through the battery cell, and to determine an impedance of the battery cell based on the determined voltage drop, based on the determined current, and based on an impedance of the field effect transistor.

Example 90 includes the subject matter of any of examples 84-89. The plurality of instructions, in response to being executed on at least one processor, cause the at least one processor to monitor a voltage drop of each field effect transistor, and to determine an impedance of each of the plurality of battery cells based on the monitored voltage drop of the field effect transistor in the current path of the battery cell.

Example 91 In some examples, an apparatus includes a detector and/or a controller to determine an impedance of each of a plurality of battery cells connected in parallel, and to disconnect one of the plurality of battery cells from the plurality of battery cells based on a relation of the impedance of the one of the plurality of battery cells with a threshold impedance.

Example 92 includes the subject matter of example 91. For each battery cell, a respective switch is connected in the current path of the battery cell, and the controller is to selectively turn on and turn off the switch.

Example 93 includes the subject matter of any of examples 91-92. The controller is to selectively connect and disconnect each battery cell from the plurality of battery cells by controlling the respective switch.

Example 94 includes the subject matter of any of examples 91-93. Each switch is (and/or includes) a field effect transistor.

Example 95 includes the subject matter of any of examples 91-94. For each of the battery cells, the controller is to turn on the battery cell and turn off the other battery cells, and to determine the impedance of the battery cell while the battery cell is turned on and the other battery cells are turned off.

Example 96 includes the subject matter of example 94. The controller is to determine, while the field effect transistor of one of the battery cells is on and the field effect transistors of the other battery cells are off, a voltage drop across the field effect transistor and the battery cell, to determine, while the field effect transistor of one of the battery cells is on and the field effect transistors of the other battery cells are off, a current flowing through the battery cell, and to determine an impedance of the battery cell based on the determined voltage drop, based on the determined current, and based on an impedance of the field effect transistor.

Example 97 includes the subject matter of any of examples 94 or 96. The controller is to monitor a voltage drop of each field effect transistor, and to determine an impedance of each of the plurality of battery cells based on the monitored voltage drop of the field effect transistor in the current path of the battery cell.

Example 98 includes the subject matter of any of examples 1-12. The controller (and/or a second controller) is/are to determine an impedance of each of a plurality of battery cells connected in parallel, and to disconnect one of the plurality of battery cells from the plurality of battery cells based on a relation of the impedance of the one of the plurality of battery cells with a threshold impedance.

Example 99 includes the subject matter of example 98. For each battery cell, a respective switch is connected in the current path of the battery cell, and the controller (and/or the second controller) is/are to selectively turn on and turn off the switch.

Example 100 includes the subject matter of example 99. The controller (and/or the second controller) is/are to selectively connect and disconnect each battery cell from the plurality of battery cells by controlling the respective switch.

Example 101 includes the subject matter of any of examples 99-100. Each switch is a field effect transistor and/or includes a field effect transistor.

Example 102 includes the subject matter of any of examples 98-101. For each of the battery cells, the controller (and/or the second controller) is/are to turn on the battery cell and turn off the other battery cells, and to determine the impedance of the battery cell while the battery cell is turned on and the other battery cells are turned off.

Example 103 includes the subject matter of any of examples 101. The controller (and/or the second controller) is/are to determine, while the field effect transistor of one of the battery cells is on and the field effect transistors of the other battery cells are off, a voltage drop across the field effect transistor and the battery cell, to determine, while the field effect transistor of one of the battery cells is on and the field effect transistors of the other battery cells are off, a current flowing through the battery cell, and to determine an impedance of the battery cell based on the determined voltage drop, based on the determined current, and based on an impedance of the field effect transistor.

Example 104 includes the subject matter of any of examples 101 or 103. The controller (and/or the second controller) is/are to monitor a voltage drop of each field effect transistor, and to determine an impedance of each of the plurality of battery cells based on the monitored voltage drop of the field effect transistor in the current path of the battery cell.

Example 105 includes the subject matter of any of examples 91-97. The controller (and/or a second controller) is/are to monitor voltage of a battery (and/or one or more of the battery cells) during constant current charging of the battery (and/or one or more of the battery cells), and to detect lithium plating of the battery (and/or one or more of the battery cells) based on a rate of change of the monitored voltage of the battery (and/or one or more of the battery cells) during constant current charging of the battery (and/or one or more of the battery cells).

Example 106 includes the subject matter of example 105. The controller (and/or the second controller) is/are to reduce or stop charge current used to charge the battery (and/or one or more of the battery cells) if lithium plating is detected.

Example 107 includes the subject matter of any of examples 105-106. The monitored voltage of the battery is an open circuit voltage of the battery (and/or of one or more of the battery cells).

Example 108 includes the subject matter of any of examples 105-107. The rate of change is a rate of change of the monitored voltage over a state of charge of the battery (and/or one or more of the battery cells).

Example 109 includes the subject matter of any of examples 105-108. The rate of change is a rate of change of the monitored voltage over charged capacity.

Example 110 includes the subject matter of any of examples 105-109. The controller (and/or the second controller) is/are to control charge current to keep the battery (and/or one or more of the battery cells) within an allowable operation temperature.

Example 111 includes the subject matter of any of examples 91-97. The apparatus includes a charger to charge a battery (and/or one or more of the battery cells) using constant current charging. The controller (and/or a second controller) is/are to monitor voltage of the battery (and/or of one or more of the battery cells) during the constant current charging of the battery (and/or of one or more of the battery cells), and to detect lithium plating of the battery (and/or of one or more of the battery cells) based on a rate of change of the monitored voltage of the battery (and/or of one or more of the battery cells) during constant current charging of the battery (and/or of one or more of the battery cells).

Example 112 includes the subject matter of example 111. The controller (and/or the second controller) is/are to reduce or stop charge current used to charge the battery (and/or one or more of the battery cells) if lithium plating is detected.

Example 113 includes the subject matter of any of examples 111-112. The monitored voltage of the battery (and/or of one or more of the battery cells) is an open circuit voltage of the battery (and/or of one or more of the battery cells).

Example 114 includes the subject matter of any of examples 111-113. The rate of change is a rate of change of the monitored voltage over a state of charge of the battery (and/or one or more of the battery cells).

Example 115 includes the subject matter of any of examples 111-114. The rate of change is a rate of change of the monitored voltage over charged capacity.

Example 116 includes the subject matter of any of examples 111-115. The controller (and/or the second controller) is/are to control charge current to keep the battery (and/or one or more of the battery cells) within an allowable operation temperature.

Example 117 In some examples, machine-readable storage includes machine-readable instructions, when executed, to implement a method or realize an apparatus as in any other example.

Example 118 In some examples, one or more machine readable medium include(s) code, when executed, to cause a machine to perform the method of any other example.

Example 119 In some examples, an apparatus includes means to perform a method as in any other example.

Example 120 In some examples, an apparatus includes a control unit (and/or a controller). The apparatus and/or the control unit and/or the controller includes means to perform a method as in any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus comprising:
a controller to:
monitor voltage of a battery during constant current charging of the battery; and detect lithium plating of the battery based on a rate of change of the monitored voltage of the battery during constant current charging of the battery.

2. The apparatus of claim 1, the controller to reduce or stop charge current used to charge the battery if lithium plating is detected.

3. The apparatus of claim 1, wherein the monitored voltage of the battery is an open circuit voltage of the battery.

4. The apparatus of claim 1, wherein the rate of change is a rate of change of the monitored voltage over a state of charge of the battery.

5. The apparatus of claim 1, wherein the rate of change is a rate of change of the monitored voltage over charged capacity.

6. The apparatus of claim 1, the controller to control charge current to keep the battery within an allowable operation temperature.

7. The apparatus of claim 1, comprising a controller to:
determine an impedance of each of a plurality of battery cells connected in parallel; and
disconnect one of the plurality of battery cells from the plurality of battery cells based on a relation of the impedance of the one of the plurality of battery cells with a threshold impedance.

8. One or more tangible, non-transitory machine readable media comprising a plurality of instructions that, in response to being executed on at least one processor, cause the at least one processor to:
monitor voltage of a battery during constant current charging of the battery; and
detect lithium plating of the battery based on a rate of change of the monitored voltage of the battery during constant current charging of the battery.

9. The one or more tangible, non-transitory machine readable media of claim 8, comprising a plurality of instructions that, in response to being executed on at least one processor, cause the at least one processor to:
reduce or stop charge current used to charge the battery if lithium plating is detected.

10. The one or more tangible, non-transitory machine readable media of claim 8, wherein the rate of change is a rate of change of the monitored voltage over a state of charge of the battery.

11. The one or more tangible, non-transitory machine readable media of claim 8, wherein the rate of change is a rate of change of the monitored voltage over charged capacity.

12. An apparatus comprising:
a controller to:
determine an impedance of each of a plurality of battery cells connected in parallel; and
disconnect one of the plurality of battery cells from the plurality of battery cells based on a relation of the impedance of the one of the plurality of battery cells with a threshold impedance.

13. The apparatus of claim 12, comprising for each battery cell a respective switch connected in a current path of the battery cell, the controller to selectively turn on and turn off the switch.

14. The apparatus of claim 13, the controller to selectively connect and disconnect each battery cell from the plurality of battery cells by controlling the respective switch.

15. The apparatus of claim 13, wherein each switch comprises a field effect transistor.

16. The apparatus of claim 12, for each of the battery cells, the controller to:
turn on the battery cell and turn off the other battery cells; and
determine the impedance of the battery cell while the battery cell is turned on and the other battery cells are turned off.

17. The apparatus of claim 15, the controller to:
determine, while the field effect transistor of one of the battery cells is on and the field effect transistors of the other battery cells are off, a voltage drop across the field effect transistor and the battery cell;
determine, while the field effect transistor of one of the battery cells is on and the field effect transistors of the other battery cells are off, a current flowing through the battery cell; and
determine an impedance of the battery cell based on the determined voltage drop, based on the determined current, and based on an impedance of the field effect transistor.

18. The apparatus of claim 15, the controller to:
monitor a voltage drop of each field effect transistor; and
determine an impedance of each of the plurality of battery cells based on the monitored voltage drop of the field effect transistor in the current path of the battery cell.

19. One or more tangible, non-transitory machine readable media comprising a plurality of instructions that, in response to being executed on at least one processor, cause the at least one processor to:
determine an impedance of each of a plurality of battery cells connected with each other in parallel;
disconnect one of the plurality of battery cells from the plurality of battery cells based on a relation of the impedance of the one of the plurality of battery cells with a threshold impedance.

20. The one or more tangible, non-transitory machine readable media of claim 19, comprising a plurality of instructions that, in response to being executed on at least one processor, cause the at least one processor to, for each battery cell, selectively turn on and turn off a respective switch coupled in a current path with the battery cell to connect and disconnect the battery cell from the other battery cells.

21. The one or more tangible, non-transitory machine readable media of claim 19, comprising a plurality of instructions that, in response to being executed on at least one processor, cause the at least one processor to selectively connect and disconnect each battery cell from the plurality of battery cells by controlling a respective switch.

22. The one or more tangible, non-transitory machine readable media of claim 21, wherein each switch comprises a field effect transistor.

23. The one or more tangible, non-transitory machine readable media of claim 19, comprising a plurality of instructions that, in response to being executed on at least one processor, cause the at least one processor to, for each of the battery cells:
turn on the battery cell and turn off the other battery cells; and
determine the impedance of the battery cell while the battery cell is turned on and the other battery cells are turned off.

24. The one or more tangible, non-transitory machine readable media of claim 22, comprising a plurality of instructions that, in response to being executed on at least one processor, cause the at least one processor to:
determine, while the field effect transistor of one of the battery cells is on and the field effect transistors of the other battery cells are off, a voltage drop across the field effect transistor and the battery cell;

determine, while the field effect transistor of one of the battery cells is on and the field effect transistors of the other battery cells are off, a current flowing through the battery cell; and determine an impedance of the battery cell based on the determined voltage drop, based on the determined current, and based on an impedance of the field effect transistor.

25. The one or more tangible, non-transitory machine readable media of claim 22, comprising a plurality of instructions that, in response to being executed on at least one processor, cause the at least one processor to:

monitor a voltage drop of each field effect transistor; and determine an impedance of each of the plurality of battery cells based on the monitored voltage drop of the field effect transistor in the current path of the battery cell.

* * * * *